United States Patent [19]
Battail

[11] 3,938,085
[45] Feb. 10, 1976

[54] TRANSMITTING STATION AND RECEIVING STATION FOR OPERATING WITH A SYSTEMATIC RECURRENT CODE

[75] Inventor: Gérard Battail, Paris, France

[73] Assignee: Thomson-CSF, Paris, France

[22] Filed: Feb. 19, 1975

[21] Appl. No.: 551,031

[30] Foreign Application Priority Data
Feb. 19, 1974  France ........................... 74.05592

[52] U.S. Cl. .............. 340/146.1 AQ; 340/146.1 BA
[51] Int. Cl.² ........................................ G06F 11/08
[58] Field of Search......... 340/146.1 AQ, 146.1 BA, 340/172.5

[56] References Cited
UNITED STATES PATENTS

| | | | |
|---|---|---|---|
| 3,571,795 | 3/1971 | Tong ......................... | 340/146.1 AQ |
| 3,697,947 | 10/1972 | Macy ......................... | 340/146.1 AQ |
| 3,831,142 | 8/1974 | Fletcher et al. ............ | 340/146.1 AQ |
| 3,842,400 | 10/1974 | Liefeld et al. .............. | 340/146.1 AQ |
| 3,876,979 | 4/1975 | Winn et al. ................ | 340/146.1 BA |

Primary Examiner—Charles E. Atkinson
Attorney, Agent, or Firm—Cushman, Darby and Cushman

[57] ABSTRACT

The transmitting station comprises coding means, including a shift-register having L stages, where L is the length of the code, for delivering continuation and repetition bit trains, each of which comprises information bits including at least L message bits as well as the parity bits associated with the information bits. In the case of a continuation bit train, the L message bits are supplied by a data source, in the case of a repetition bit train, they are fed back to the coding means from the shift-register. In the receiving station, the decoding of messages bits is a conventional decoding in accordance with the code where a continuation bit train is concerned, but also takes into account the previously decoded value where a repetition bit train is concerned. The trains may be identified by mean of prefixes of $N_1$ bits, in which case, each bit train comprises $(N_1 + L)$ information bits.

10 Claims, 11 Drawing Figures

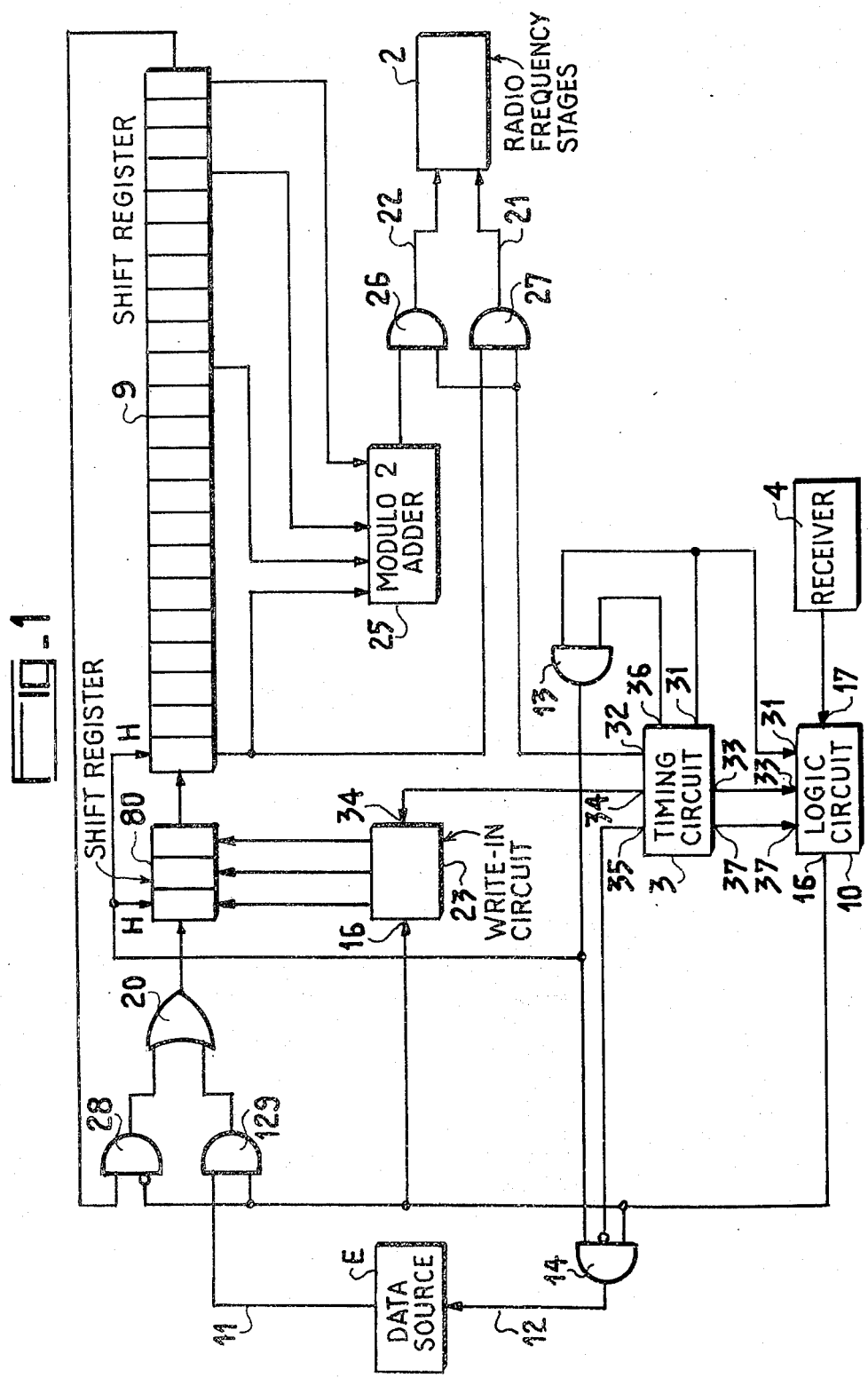

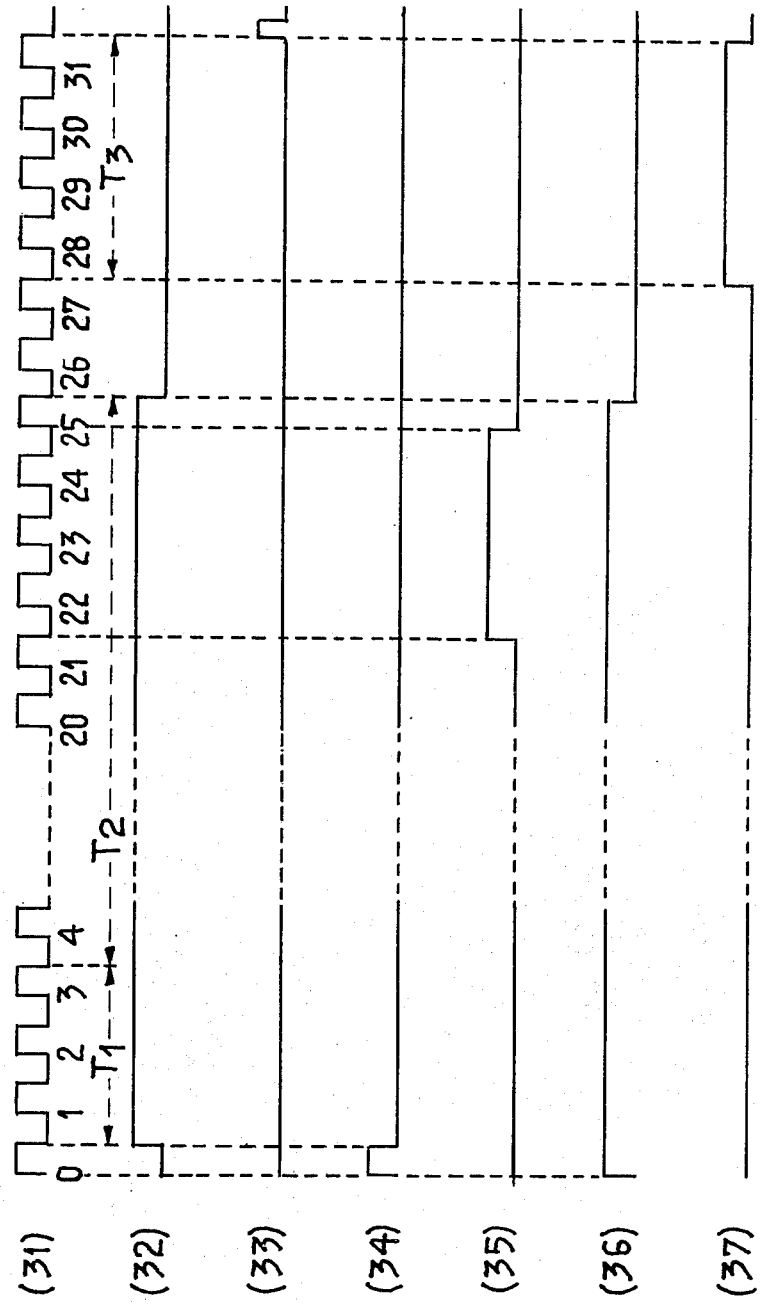

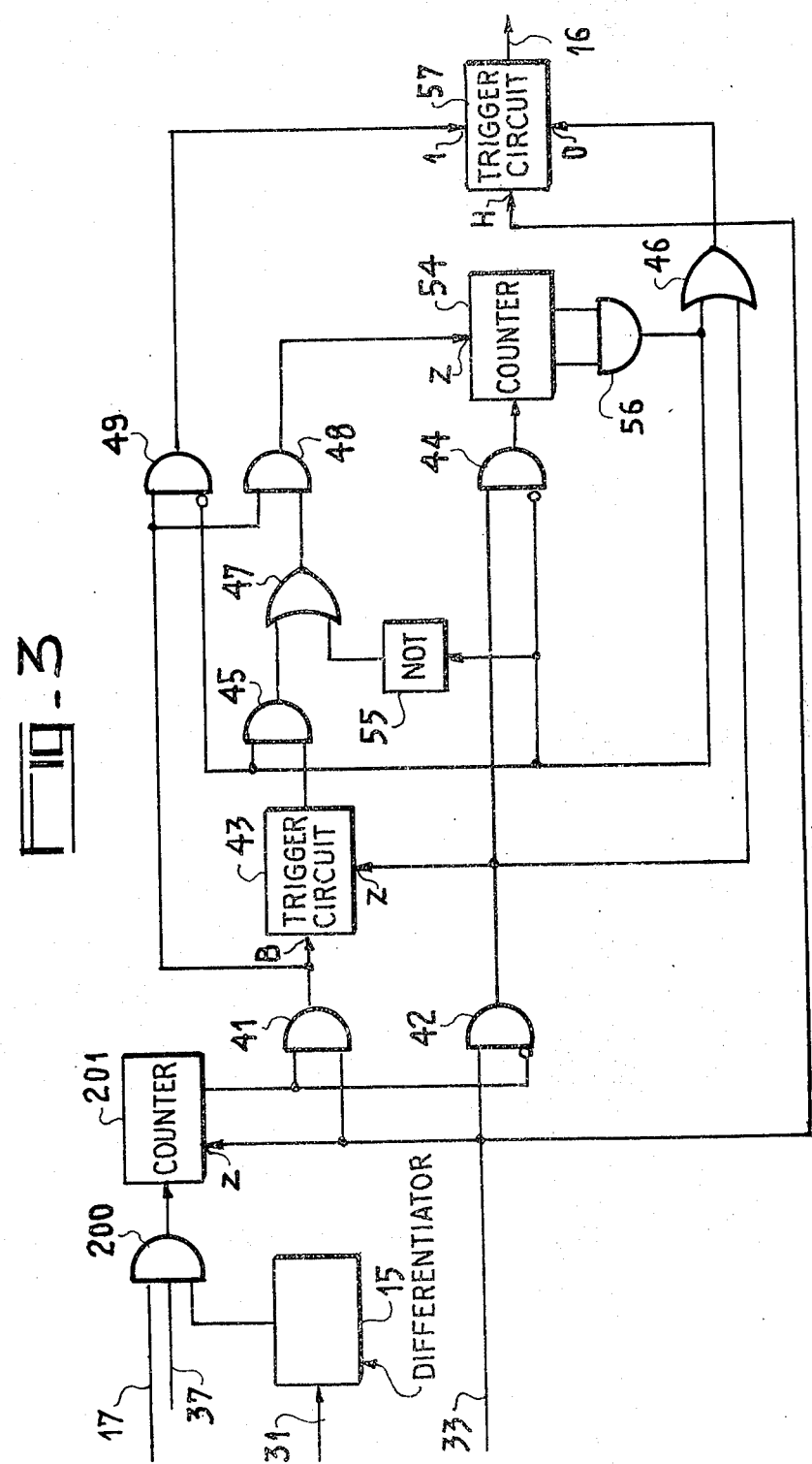

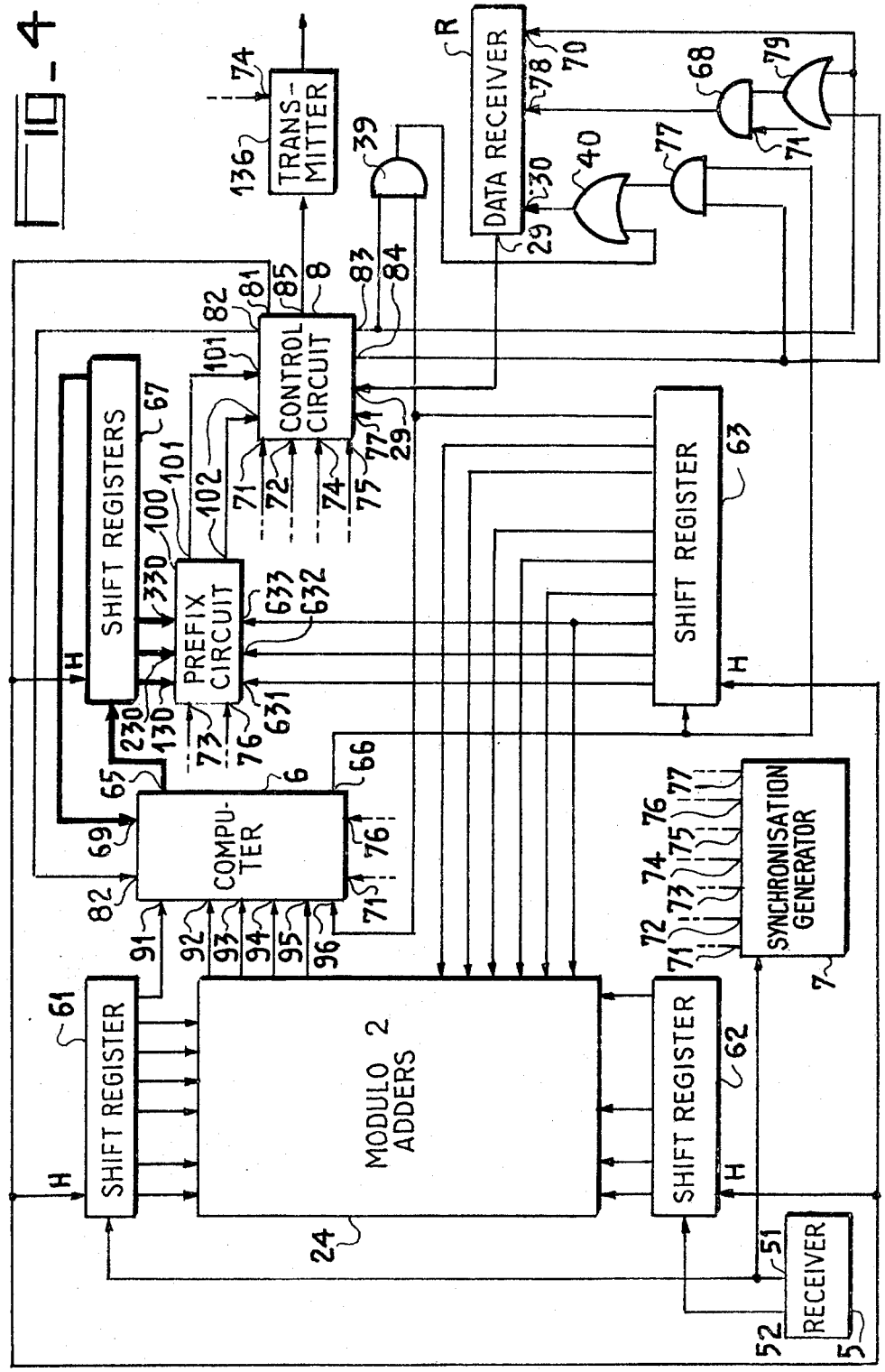

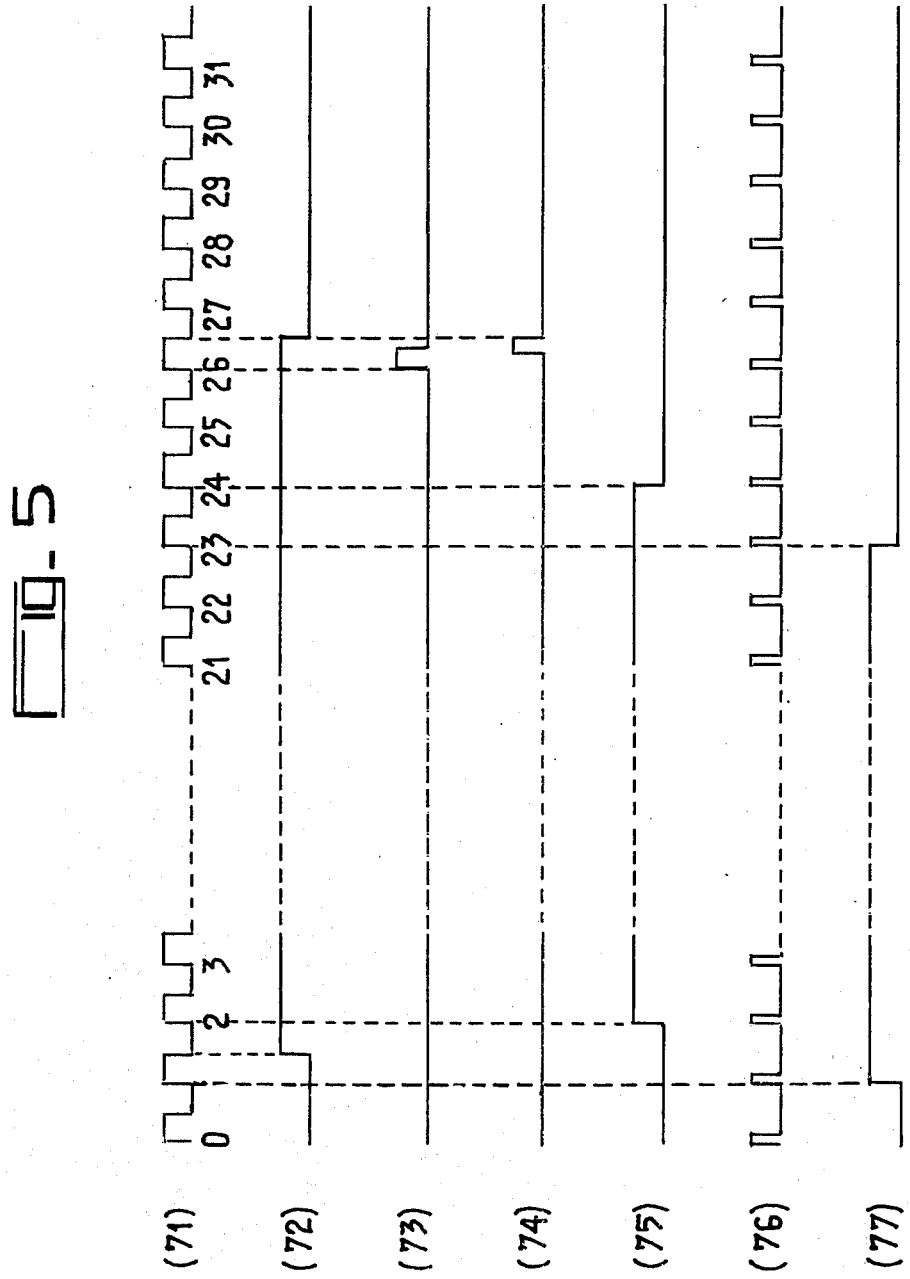

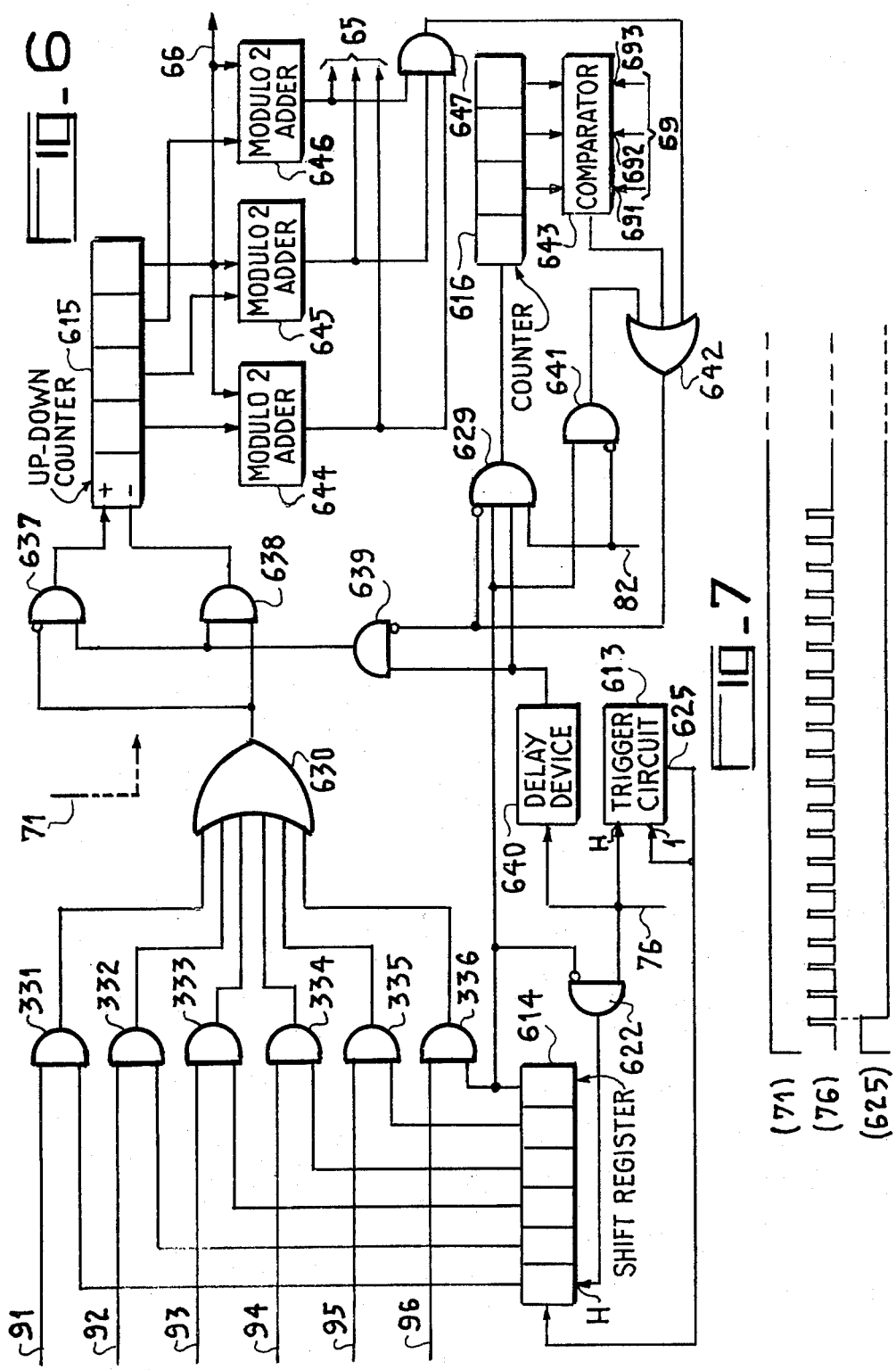

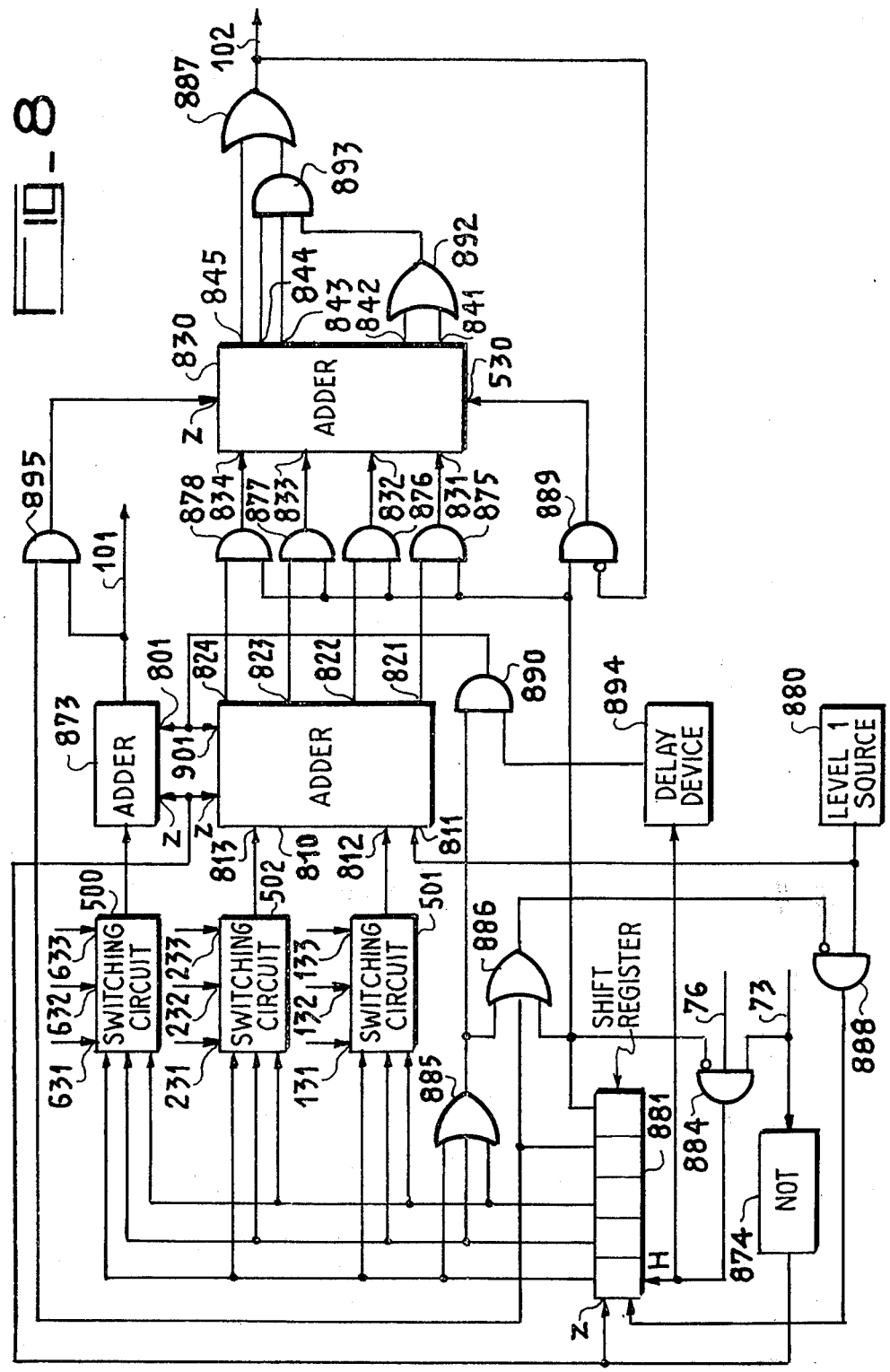

TRANSMITTING STATION AND RECEIVING STATION FOR OPERATING WITH A SYSTEMATIC RECURRENT CODE

The invention relates to a transmitting station for information translated into binary signals and a corresponding receiving station, forming a transmission system which is well protected against errors.

Long-wave or short-wave radio transmission is affected by atmospheric noise, depending on storm activity; in short-wave transmission, the received signal also undergoes fluctuations and may even fade out, depending on the ionospheric propagation conditions. Consequently, it is particularly difficult to obtain data transmission wherein the proportion of errors is not greater than in wired transmission.

One solution is to use self-correcting codes. The efficiency of these codes, however, is critically dependent on the probability of error in the transmission channel, in that the residual error probability is a very rapidly-increasing function thereof. The possibility of correcting these codes is closely dependent on redundancy which, for a given channel and modulation system, determines the actual transmission speed. In order to maintain the efficiency of the system under the worst conditions, it is usually necessary for the actual speed to be very low, the redundancy being considerable but nearly always unnecessary. More realistic use of the correcting codes ensures good-quality transmission but only whenn the conditions are sufficiently favourable; a lowering of quality is accepted during part of the time.

Another solution, which has been tested inter alia on short wave under the name of T.O.R. (the initials of the English words "Teleprinting Over Radio"), is applicable when a return channel is available and consists is using an error detecting block code together with a possibility of repetition.

It will be recalled that in contradistinction with a recurrent code, a code block divides the message into successive blocks of $n$ bits, each $n$-bit block being substituted for transmission by a $p$-bit block which is entirely determined by this $n$-bit block, $n$ and $p$ and being fixed numbers, and $p$ being greater than $n$. The $p$-bit blocks which are transmitted belong to a limited list of the sequences of $p$ bits among the general list of the $2^p$ sequences of $p$ bits which exist. In the systems of the above-mentioned type, a received $p$-bit code which does not belong to the limited list gives rise to a request for repetition. This solution ensures a lower threshold for the quality of the accepted data, with, as a counterpart, an important slowing down of the average transmission speed when the quality of the channel decreases. It involves a waste of information, since the information contents of each of the blocks having given rise to repetition is not used.

The system formed by a transmitting station and a receiving station according to the invention combines the use of a systematic recurrent self-correcting code with a possibility of repetition.

According to the invention, there is provided a transmitting station for transmitting intelligence from a binary data source, said station comprising: coding means having an input, for coding in a systematic recurrent code of length L a sequence of bits applied to said input, said coding means comprising a shift-register having L successive stages, the first of said stages having an input and an output, and the last of said stages having an output, said input of said first stage forming the input of said coding means, and $m$ module 2 adders, $m$ being a positive integer, having respective outputs, each of said adders having a plurality of inputs respectively coupled to different stages of said shift register, and an output, for delivering at its output a parity bit associated with the bit appearing at said output of said first stage; a timing circuit; first further means coupled to said timing circuit for successively applying to said input of said coding means the bits of a group of L message bits from said data source; second further means, coupled to said timing circuit, for successively applying to said input of said coding means the bits of a group of L message bits previously stored in said shift register; controlling means, coupled to said timing circuit, for selectively actuating either said first further means or said second further means; and means for transmitting bit trains, referred to as continuation bit trains, each of which includes the L bits appearing at said output of said first stage of said shift register upon said first further means being actuated by said controlling means, and the parity bits associated therewith, and further bit trains, referred to as repetition bit trains, each of which includes the L bits appearing at said output of said first state of said shift register, upon said second further means being actuated by said controlling means, and the parity bits associated therewith.

According to the invention, there is further provided a receiving station comprising a receiver adapted for receiving a sequence of bit trains comprising identifiable continuation bit trains and repetition bit trains, the corresponding transmitted sequence resulting from the coding in a systematic recurrent code of information bits including at least message bits, and the formation of continuation and repetition bit trains, each including a predetermined number of information bits and the parity bits associated therewith, the message bits of a transmitted repetition bit train being identical to the message bits of the previously transmitted bit train; said station further comprising: a decoding arrangement for decoding the message bits included in the received bit trains, said decoding arrangement having a signal input coupled to said receiver, a control input, a first output for delivering the decoded bits, and a second output for delivering auxiliary signal, each of which is representative of the probability of accurateness of the decoded bit simultaneously appearing at its first output; signal generating means for identifying the nature, continuation or repetition, of the received bit trains and applying to said control input of said decoding arrangement, during the decoding of the message bits from a bit train, a control signal which is a first or a second decoding control signal according to whether the message bits being decoded belong to a continuation or a repetition bit train; a shift-register having an input coupled to said first output of said decoding arrangement and an output coupled to said decoding arrangement, for supplying thereto, when a message bit is being decoded, the decoded message bit corresponding to the message bit occupying in the bit train previously applied to said signal input of said decoding means the same position number as the message bit being decoded occupies in the bit train to which it belongs; storing means having an input coupled to said second output of said decoding arrangement and an output coupled to said decoding arrangement for supplying thereto the auxiliary signal associated with the bit simultaneously delivered by said output of said shift-register; said decoding arrangement comprising a decoder adapted to said code, whose input is said input of said decoding arrangement, and computing means coupled to said decoder, for, when a continuation bit train is applied to said input of said decoding arrangement, delivering for each message bit, at its first and second outputs respectively, a decoded bit and an associated auxiliary signal which are wholly determined by this continuation bit train and, when a repetition bit train is applied to said input of said decoding arrangement, delivering, for each message bit, at its first and second outputs respectively, a decoded bit and an associated auxiliary signal which are predetermined functions of the decoded bit and of the auxiliary signal which would be supplied if the message bit belonged to a continuation bit train, of the bit supplied by said output of said shift-register while this message bit is being decoded, and of the auxiliary signal simultaneously supplied by said output of said storing means, the operations performed by the decoding arrangement being respectively referred to as continuation decoding in the first case, and repetition decoding in the second case, and the nature of the decoding performed being determined by that one of said first and second decoding control signals which is applied to said control input.

The invention will be more clearly understood and other features will be clear from the following description and accompanying drawings in which:

FIG. 1 is a diagram of a transmitting station for binary data according to the invention;

FIG. 2 is a diagram of the synchronisation signals used in the station in FIG. 1;

FIG. 3 is a detailed diagram of a circuit from the diagram in FIG. 1;

FIG. 4 is a diagram of a receiving station for binary data according to the invention;

FIG. 5 is a diagram of the synchronisation signals used in the station in FIG. 4;

FIGS. 6, 8 and 9 are detailed diagrams of components of the circuit in FIG. 4;

FIG. 7 is a time diagram relating to the circuit of FIG. 6;

Figure 9:
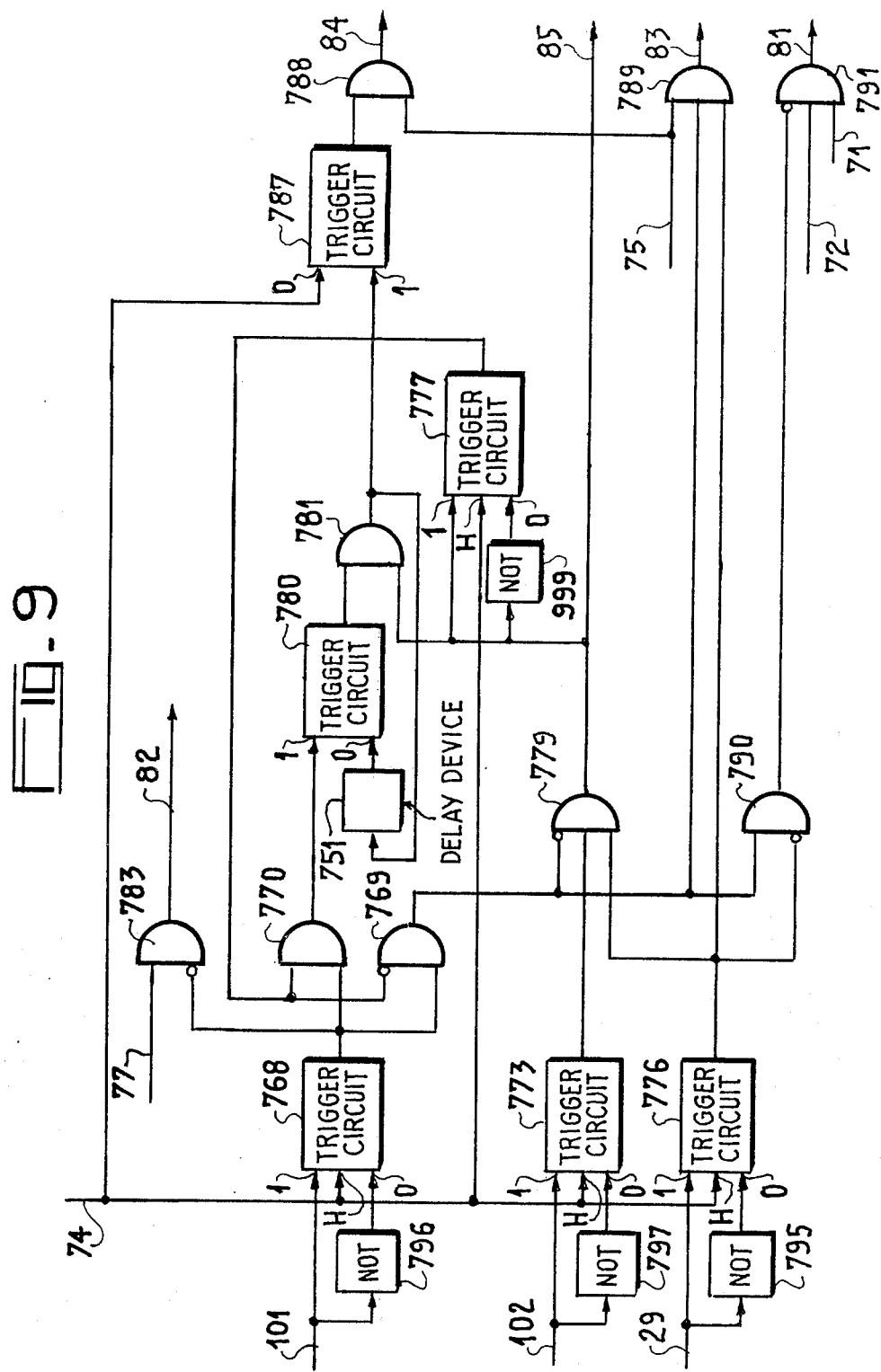

The following will be assumed in the description of the described examples:

The binary signals or bits have a duration T and a level 1 or 0 depending on their value. Independent of its duration, a "signal 1" or a "signal 0" denotes a lever 1 signal or a level 0 signal. A "pulse" always has the level 1.

The signals supplied by certain circuits (usually control or synchronisation) will be denoted by the same reference number (but in brackets) as the output of the circuit supplying them; the inputs of complex circuits receiving the same signals are also denoted by the same numbers as the corresponding outputs, except for the zero resetting inputs, which are systematically denoted by Z. With regard to the trigger circuits, an input for putting into state 1 will be called a "1" input and denoted by the sign 1. An input for putting into the state 0 will be called a "0" input and denoted by the sign 0 when its operation is symmetrical with that of a "1" input; in other cases it will be called a zero-resetting input and denoted by Z. An enabling input, also called a "clock input", will be denoted by the symbol H. Symbol H will also be used for the shift register clock inputs.

First some information will be given regarding the general operation of the non-limitative embodiment of the invention shown in FIGS. 1 – 9, wherein the two stations A and B of the system are assumed to be stationary, and the return transmission time between the digital circuits A and B is assumed (solely in order to simplify the description) to be equal to a multiple $2N_3T$ of the duration T of a binary signal or bit, more particularly with $N_3 = 1$.

This convention, i.e. that the duration of transmission is equal to the duration of a bit between the digital circuits of stations A and B, simplifies the description. In reality, the duration will usually be longer since, in order to perform demodulation in the high-frequency circuits and convert the detected low-frequency signals into digital signals, the decision on each low-frequency signal representing a bit should preferably not be made until the entire low-frequency signal has been received.

Station A periodically transmits a bit train comprising $(N_1+N_2)$ information bits and $(N_1+N_2)$ parity bits in a recurrent, systematic self-correcting code which, by way of example, will be assumed to be such that each information bit $i_n$ is associated with a parity bit $p_n$. $N_1$ and $N_2$ are defined hereinafter.

The self-correcting code used is defined by the relation:

$$p_n = i_n + i_{n\text{-}12} + i_{n\text{-}18} + i_{n\text{-}12} \qquad (M)$$

The notation (M) is adopted to indicate that a sum or an equality should be understood as "modulo 2".

The first $N_1$ information bits form a prefix and the last $N_2$ bits come from a data source.

The prefix can take only one or the other of two predetermined forms indicating whether the following $N_2$ information bits form the "continuation" of the message in the preceding train, or the repetition thereof.

The number $N_2$ of message bits is equal to the "code length" obtained by increasing by unity the maximum difference between two indices appearing in the relation defining the code; in the present case, therefore, we have $N_2 = 22$.

With regard to the number $N_1$, it should be at least equal to the minimum difference between two of these indices. It will be assumed that $N_1 = 3$, the continuation prefix being 101 and the repetition prefix being the "complement" thereof, i.e. 010.

Or course, these values of $N_1$ and $N_2$ are deliberately made low so as not to overburden the description. They are normally much higher.

The $N_2$ bits of a train coming from the data source will be called the "message" bits as opposed to "prefix bits". The term "information bit" covers both a prefix bit and a message bit, as opposed to "parity bits".

The notation $i_n$ will be used to denote the information bit having the position number $n$ ($n$ being any integer) in the sequence of bit trains, and the notation $I_m$ to denote the message bit having the position number $m$ ($m$ being any integer) in the sequence of bits supplied by the data source.

It will further be assumed that the digital circuits supplying the radio frequency transmitter of station A supply information bits and parity bits in parallel, and that the digital circuits of station B likewise receive these bits on two parallel channels from the radio-frequency receiver. This is merely for simplifying the description, since parallel-series conversion on emission and series-parallel conversion on reception are conventional operations.

After each train has been transmitted, the station A stands by for a "repetition" or "continuation" return signal indicating whether or not it is necessary to repeat the message which has been transmitted, the duration of the return signal being that of $N_4$ bits.

It will be assumed $N_4 = 4$.

A cycle lasts 32 T, T being the duration of a bit.

Accordingly, the time program during a cycle, with regard to transmission and reception, of the digital circuits of station A is as folows, the duration T being taken as the unit of time:

From 0.5 to 3.5; time interval $T_1$; transmission of coded prefix.

From 3.5 to 25.5; time interval $T_2$; transmission of coded message.

From 27.5 to 31.5; time interval $T_3$; reception of return signal.

FIG. 1 is a diagram of station A, which comprises an input 11 for supplying message bits and a clock output 12, input 11 being adapted to be connected to the output of a data source and output 12 being connected to a synchronisation input of the source, which is represented by unit E. Source E supplies input 11 with a new bit in the sequence to be transmitted, under the action of the leading edge of each pulse received from output 12.

A timing circuit 3 supplies different signals illustrated in the diagram in FIG. 2 where, as already explained, they are denoted by the same numbers (between brackets) as the outputs of circuit 3 which supply them. FIG. 2 also shows the aforementioned time intervals $T_1$, $T_2$ and $T_3$.

In each cycle of duration 32, circuit 3 supplies the following (T being the time unit as before):

At an output 31: pulses of duration ½ at the bit recurrence frequency, the leading edges of the pulses coinciding with the instants $k$, $k$ being an integer.

At outputs 32: a level "1" signal between $t = 0.5$ and $t = 25.5$.

At output 33: a level "1" pulse having a duration ¼, beginning at the instant 31.5.

At output 34: a pulse of duration ½, beginning at instant 0.

At output 35: a signal 1 between $t = 21.5$ and $t = 25$.

At output 36: a signal 1 between $t = 0$ and $t = 25$, and

At output 37: a signal 1 between $t = 27.5$ and $t = 31.5$

A logic circuit 10, to be described hereinafter, supplies a signal 1 or 0 at an output 16 between instant 31.75 in the $(p-1)^{th}$ cycle and 31.75 in the $p^{th}$ cycle depending on whether the station is due to transmit a new message during the $p^{th}$ cycle or repeat the preceding message, depending on the return signal of the $(p-1)^{th}$ cycle.

The station comprises a three-state shift register 80, the three stages having auxiliary inputs for writing in the continuation prefix 101 or the repetition prefix 010 depending on the value of the signal supplied by output 16 of logic circuit 10. The writing-in is controlled by a writing-in circuit 23 comprising three outputs connected to the three auxiliary inputs of register 80 and two inputs 16, 34 connected respectively to output 16 of logic circuit 10 and to output 34 of timing circuit 3; depending on the value of the signal 16 at the instant when it appears, pulse 34 causes circuit 23 to write the appropriate prefix in register 80 at the instant 0.

A second register 9 has 22 stages corresponding to the 22 bits of a message.

The stages of register 9, like those of register 80, are symbolised by boxes separated by vertical lines.

The 1st, 13th, 19th and 22nd stages of register 9 have auxiliary outputs respectively connected to the four inputs of a modulo 2 adder 25, so that if the information bits $i_n$ to $i_{n-21}$ are written in the 1st, 2nd ... 22nd stages respectively, the output of adder 25 supplies the parity bit $p_n = i_n + i_{n-12} + i_{n-18} + i_{n-21}$ The output of register 80 is connected to the input of register 9 and, as will be seen, these two registers receive the same clock pulses and can therefore be combined in a single 25-stage register. They have been separated only in order to simplify the description.

The auxiliary output of the first stage of register 9 and the output of adder 25 are respectively connected to outputs 21 and 22 of the digital circuits of the station via two AND gates 27, 26, the second inputs of which receive the signal 32 from the timing circuit 3.

An AND gate 13 has its two inputs connected to outputs 31, 36 respectively of timing circuit 3 and therefore supplies the trailing edges of those pulses 31 which appear at instants 0, 1, 2 ... 24. These pulses are applied to the clock inputs H of registers 80 and 9, which respond to the trailing edges of the pulses.

A three-input AND gate 14 has a first input connected to the output of gate 13, a second input, which is an inverting input, connected to output 35 of timing circuit 3 and a third input connected to output 16 of circuit 10. Consequently, AND gate 14 supplies the leading edges of those pulses 13 appearing at the instants 0, 1, 2 ... 21 provided that the signal (16) then has the value 1. The output of gate 14 forms the output 12 of the digital circuits of the station which is connected to the synchronisation input of the data source E.

Since the main elements of the station have been mentioned, it will now be described in greater detail together with the operation thereof, starting from instant 0 of the $p^{th}$ cycle.

At this instant, as will be shown hereinafter, the 22 message bits transmitted during the $(p-1)^{th}$ cycles are still written in register 9. It will also be noted that the prefix of the message to be transmitted during the $p^{th}$ cycle was written in register 80 at the instant 0 of the same cycle.

First, it will be assumed that the "continuation" prefix is written in register 80, which means that output 16 of circuit 10 provides a signal 1.

Each of the pulses (31) appearing at the instants 0, 1 ... 21 at output 12 is consequently transmitted to the data source and each causes a new bit to appear at the station input 11 connected to the data output of source E.

Input 11 is connected to the first input of an AND gate 129 whose second input is connected to output 16 of logic circuit 10. Consequently, the bits provided as a result of the pulses appearing an output 12 are available at the output of gate 129 and are transmitted thereby to the input of register 8, via an OR gate 20.

At the instants 0.5, 1.5 and 2.5 the three prefix bits are successively written in the first stage of register 9 and appear in succession at output 21. The corresponding parity bits appears at output 22, since gates 26 and 27 are made conductive by signal (32) between 0.5 and 25.5.

Each time a clock pulse is applied to the registers, a bit coming from the data source enters register 80.

At the instant 3.5, the bit $I_m$ which is the first bit in the message to be transmitted, in turn enters register 9 and is transmitted to output 21, the corresponding parity bit appearing at 22.

At instant 24.5, bits $I_m$ to $I_{m+21}$ have been written in register 9 and these bits together with the corresponding parity bits have been applied to outputs 21 and 22.

The remaining bit $I_{m+21}$ written in register 9 and the corresponding parity bit still appear at the output of adder 25 but the transmission thereof is terminated at the end of duration T by the signal (32) applied to gates 26 and 27, signal (32) terminating at instant 25.5. Outputs 21 and 22 supply the radio-frequency stages (2) of the station.

The registers no longer receive feed pulses and there is no change until the return signal is received by the digital circuits of station A, the reception beginning at instant 27.5.

The coded return signal comprises e.g. four 1 bits for a continuation request and four 0 bits for a repetition request, i.e. a signal which is transmitted in any suitable manner but in different ways for continuation and repetition during the duration $N_4$, and which is demodulated so as to supply level 1 in the first case and level 0 in the second case; the corresponding demodulated signals are applied between $t = 27.5$ and $t = 31.5$ by a receiver 4 to an input 17 of circuit 10. Circuit 10 comprises three other inputs 31, 37 and 33 connected to the corresponding outputs of timing circuit 3. Output 33 of timing circuit 3 supplies the pulse (33) appearing at instant 31.5 of each cycle. The level of the output signal 16 of logic circuit 10 may be inverted at the instant where the trailing edge of pulse (33) occurs; if it remains in state 1, the continuation prefix is written in register 80 at the instant 0 of the following cycle and the next cycle is the same as before, since the bits of the aforementioned prefix and the message bits $I_{m+22}$ to $I_{m+43}$ are transmitted together with the corresponding parity bits during the $(p+1)^{th}$ cycle.

In the contrary case, signal (16) changes to level 0, and the repetition prefix is inscribed in register 80. On the other hand the circuit supplying registers 80 and 9 from the data source is made non-conductive. It is replaced in the following manner, causing the previous message to be repeated after the prefix. The output of register 9 is connected to the first input of an AND gate 28 whose second input, which is an inverting input, receives the signal (16) of circuit 10 and whose output is connected to the second input of the OR gate 20. The clock inputs are supplied as before, and it can be seen therefore that the $(p+1)^{th}$ cycle will repeat the message and, at the end of the $(p+1)^{th}$ cycle, register 9 will return to the same state as at the beginning of the cycle, so that either the transmission of information can continue or a new repetition can be given, by one or the other of the aforementioned processes.

FIG. 3 shows an embodiment of logic circuit 10. It comprises an AND gate 200 having three inputs, the first input being connected to input 17 and receiving the output signal of receiver 4, the second input being connected to input 37 of circuit 10 and supplying it with a square wave signal between $t = 27.5$ and $t = 31.5$ and the third input being connected to input 31 of circuit 10 via a differentiator circuit 15 supplying output pulses for the leading edges of the input pulses thereof. Consequently, gate 20 transmits the differentiator circuit output pulses appearing at instants 28, 29, 30 and 31 if the output signal of receiver 4 is at level 1 during the same instants, and a request for continuation will be assumed in this case only. An additional precaution, which is not absolutely necessary, consists in not enabling the AND gate 200 except during a signal (37).

The output of gate 200 is connected to the input of a binary counter 201 having three stages, comprising a zero resetting input Z connected to the circuit input 33, the counter being reset to zero by the trailing edge of pulse (33). The counter output is the output of its third state. The counter is sensitive to leading edge of its input pulses. Consequently, it delivers 1 a signal between $t = 31$ and 31.75 when a return signal has been received and interpreted as a request for continuation; in the case of station A, this is the only return signal which will hereinafter be called a continuation request signal.

The following supplementary conditions will now be imposed in order to avoid a possibly erroneous continuation of transmission, since, in order to avoid a considerable increase in the duration of the cycles, it is preferable not to code the return signal. When the number of repetition of a message has reached a threshold value of e.g. 3, denoting that the general quality of the channel is bad, it will be necessary to detect two successive continuation requests before stopping the repetition.

To this end, the output of counter 201 is connected to the first input of an AND gate 41 and to the first input, which is an inverting input, of an AND gate 42. Input 33 is connected to the second inputs of gates 41 and 42.

Pulse (33), which has a duration ¼, consequently appears between instants 31.5 and 31.75 at the output of gate 41 or at the output of gate 42, depending on whether there is a request for continuation or for repetition. The output of gate 41 is connected to the triggering input B of a trigger circuit 43 which also has a zero resetting input Z connected to the output of gate 42. Trigger circuit 43 is designed so that it changes state for the trailing edges of the pulses applied to its triggering input B if its Z input receives a signal 0, and changes to state 0 if not already in this state, independently of the signal applied to its triggering input as soon as a level 1 signal appears at its zero resetting input Z. The output of trigger circuit 43 is connected to the first input of an AND gate 45 whose output is connected to the first input of an OR gate 47. The outputs of AND gate 41 and the OR gate 47 are connected to the two inputs of and AND gate 48.

The output of AND gate 42 is connected to the first input of an AND gate 44 whose second input is an inverting input. The output of gate 44 is connected to the input of a two-stage modulo 4 binary counter 54 having a zero resetting input Z. The count in the counter changes for any 0 — 1 transition in the level of the signal applied to its input, the four binary states 00, 01, 10 and 11 of the counter corresponding to the four decimal counts 0, 1, 2 and 3 respectively. An AND gate 56 receives the output signals of the two stages of counter 54.

The output of gate 56 and the output of gate 41 are connected respectively to the first and second input of an AND gate 49 whose first input is an inverting input. The output of gate 56 is also connected to the second input, which is an inverting input, of AND gate 44, to the second input of AND gate 45, and, via a NOT circuit 55, to the second input of OR gate 47. The output of gate 56 is also connected to an input of an OR gate 46 whose other input is connected to the output of gate 42, input Z of trigger circuit 43 is connected to the output of gate 42, and input Z of the binary counter 54 is connected to the output of gate 48.

Output 16 of circuit 10 is the output of a trigger circuit 47 comprising a clock input H connected to input 33 of circuit 10, a "1" input connected to the output of AND gate 49 and a "0" input connected to the output of OR gate 46.

Trigger circuit 57 is designed so that is cannot change state except on the trailing edges of the pulses applied to its clock input H; at such instants, it assumes state 1 if the signal applied to its "1" input is at level 1 and the signal applied to its "0" input is at level 0, whereas it assumes state 0 if the signal applied to its "1" input is at level 0 and the signal applied to its "0" input is at level 1. In other cases it cannot change state.

The arrangement operates as follows:

Immediately before instant 31.5 of the $p^{th}$ cycle, the count of counter 54 as will be seen, is equal either to the number $r$ of consecutive repetition requests previously detected by gate 42 since the last continuation request was detected, or to the maximum count 3 if $r$ is greater than 3. Trigger circuit 43 can be in state 0 or in state 1.

1: First, will be assumed that at instant 31.5 of the $p^{th}$ cycle, the corresponding pulse (33) passes through gate 42, i.e. the return signal is a repetition request. Gate 41 does not supply any signal, but trigger circuit 43 is reset to zero, if not at zero already, by the output pulse of gate 42.

This output pulse is also transmitted via OR gate 46 to the "0" input of trigger circuit 57 whose "1" input receives a signal 0, since gate 49 is blocked in any case by gate 41. At instant 31.75, trigger circuit 57 changes to or remains in state 0, thus resulting in a repeat transmission during the $(p+1)^{th}$ cycle.

Hypothesis I must now be subdivided into the following two:

1A: Immediately before instant 31.5 counter 54 is not saturated, gate 56 supplies a zero-level signal and gate 44 transmits the output pulse of gate 42 to the binary counter, whose count increases by 1 unit.

1B: Counter 54 is saturated. Gate 56 blocks gate 44 and the counter is kept in state 3. The level 1 signal supplied by gate 56 is likewise transmitted via gate 46 to the "0" input of trigger circuit 57, but this merely adds to the effect of the pulse transmitted by gate 47 and does not in any way modify the behaviour of trigger circuit 57.

It will now be assumed that the return signal requests the continuation of transmission. This case may be subdivides into the following three:

II (A): Counter 54 is not saturated. This time, the pulse (33) appearing at the instant 31.5 of the $p^{th}$ cycle is transmitted by gate 41 and reaches the "1" input of trigger circuit 57 via gate 49. OR gate 46 does not receive any signal so that level 0 is present at the "0" input of trigger circuit 57, which thus takes or keeps state "1" at the instant 31.75. This ensures that a continuation is transmitted during the following cycle.

On the other hand, the OR gate 47 receives a signal 1 from the NOT circuit 55, thus opening AND gate 48 for the output pulse of gate 41. Consequently, the binary counter is reset to zero, it not at zero already, at instant 31.5.

Second hypothesis:

II (B) Counter 54 is saturated and trigger circuit 43 is at state 1.

This means that, during the $(p-1)^{th}$ cycle, the return signal detected was a continuation request (otherwise trigger circuit 43 would be in state 0), and that this request was not complied with because trigger circuit 57 could not have assumed state 1 ensuring continuation, since counter 54 was saturated and rendered gate 49 non-conductive.

This is thus the case of a continuation request following a continuation request which has remained ineffective, and the second request must be acted upon. This is done as follows: Trigger circuit 43 is in state 1 until instant 31.75, when it is reset to zero by the trailing edge of the output pulse of gate 41. Gate 45, which receives the output signal of trigger circuit 43 and the output signal of gate 56, acts via OR gate 47 so that AND gate 48 conducts the pulse provided by gate 41, well before the end of the last-mentioned pulse. Binary counter 54 is reset to zero by the leading edge of the output signal of gate 48, and gate 56 supplies a 0 signal to the inverting input of gate 49, which then transmits the output pulse (slightly mutilated) of gate 41. Consequentely, trigger circuit 57 will change to state 1 at instant 31.75.

II (C): Counter 54 is saturated and trigger circuit 43 is in state 0. This means that the continuation request received at the end of the $p^{th}$ cycle is the first since the repetition request which resulted in the saturation of the counter. The reason why is that if the continuation request had been the second, trigger circuit 43 would have been triggers to state 1 by the trailing edge of the pulse (33) of the $(p-1)^{th}$ cycle and that no third request would be possible, in accordance with the process described in II (B). Consequently, the repetition must be continued during the $(p+1)^{th}$ cycle. Thus is done as follows: Between instants 31.5 and 31.75, trigger circuit 43 remains in state 0, and gate 45 is blocked, OR gate 47 does not receive anything, gate 48 cannot transmit the output pulse of gate 41, and counter 54 is not reset to zero. Consequently gate 56 continues to supply a level 1 signal, and gate 49 is blocked. Trigger circuit 57 therefore receives the zero level at its "1" input and receives the signal of gate 56 at its "0" input via OR gate 46. It remains in state 0 at instant 31.75, when the trailing edge of the pulse is applied to its H input.

FIG. 4 is a diagram of station B.

In FIG. 4, a receiver 5 applies the information bits and the corresponding parity bits to two outputs 51, 52 between $t = 1.5$ and $t = 26.5$, the bits corresponding after transmission to those which have been transmitted between $t = 0.5$ and $t = 25.5$ on outputs 21 and 22 (FIG. 1) of the digital circuits of station A.

Station B comprises a synchronisation signal generator 7 operating in a 32 T cycle which is synchronised with the receiving cycle (i.e. with the transmitting cycle disregarding the transmission time) by conventional methods, and which uses the output signals of the digital output 51 of receiver 5, those signals supplying the phase of the bits and, after recognition of the first received prefix, which is necessarily a continuation prefix, the phase of the cycles.

Generator 7 supplies the signals illustrated in FIG. 5. At its output 71, there are pulses having a duration ½ and the recurrence frequency of the bits, those pulses, appearing at the instants $t = k$, $k$ being an integer; at its output 72 there is a two-level signal having the level 1 between instants 1.5 and 26.5 and the level 0 during the rest of the time; at its output 73 there is a pulse beginning at instant 26 and ending a little after instant 26.25, e.g. 26.3, to ensure an overlap with the pulse provided at output 74 and defined hereinafter; at output 74 there is a pulse beginning at instant 26.25 and terminating at instant 26.5; at its output 75, there is a signal having the level 1 between instants 2 and 24 and level 0 for the rest of the time; at its output 76 there is a train of 20 short pulses appearing at the instants $k + 0.01, k + 0.02 \ldots k + 0.20$ for each pulse (71) appearing at an instant k (only the envelopes of these pulse trains are shown in FIG. 5) and at its output 77 there is a level 1 signal between $t = 1$ and $t = 23$.

In order to simplify the drawing, the connections between the outputs of the synchronisation generator and the other units of FIG. 4 are only shown in part; there can be no ambiguity, however, since the other units are provided with "synchronisation inputs" denoted by the same numbers as the outputs of generator 7 connected thereto.

A control circuit 8 comprises synchronisation inputs 71, 72, 74, 75 and 77.

The station comprises two registers 61 and 62, each having 22 stages, the inputs of which are respectively connected to outputs 51 and 52 of receiver 5, the first receiving information bits $i'$ and the second receiving the parity bits $p'$, the prime symbol showing that they may, differ owing to faulty transmission, from the $i$ and $p$ bits.

A third register 63 has 25 stages and is adapted to receive the successively evaluated $i''$ bits from a computer 6. An assembly 67 comprises three shift registers in parallel, each having 25 stages, adapted to receive a value V which will be defined hereinafter and is associated with each of the decoded bits $i''$. Value V, which is limited to the value 7, is expressed by a three-bit binary integer. To simplify the drawing, this group of registers has been symbolically indicated by a single rectangle shown in thicker lines than the single registers. Similarly all the triple inputs and outputs conveying the values V are represented by individual connections shown by thicker lines than the single connections.

The clock inputs H of registers 61, 62, 63 and of the three registers 67 are connected to an output 81 of the control circuit 8 which normally (i.e. except for an exceptional case described hereinafter) feeds them at the instants 2, 3, 4 ... 26 of each cycle.

The writing of the received bits into registers 61 and 62 is therefore performed on the centres of the bits, the reception period extending from 1.5 to 26.5.

In register 62, the parity bits always occupy the stages of the same position number as the corresponding information bits in register 61, and they will not mentioned henceforth. Similarly, the values V associated with a decoded bit $i''$ always occupy, in the register assembly 67, groups of stages having the same position number as the corresponding bit $i''$ in register 63.

When an information bit $i'_n$ enters the last stage of register 61, bits $i'_{n+21}$ to $i'_{n+1}$ occupy the 21 first stages thereof and, as will be seen, the decoded bits $i''_{n-1}$ to $i''_{n-25}$ occupy the 25 stages of register 63.

An information bit $i'_n$ entering the last stage of register 61 is decoded while it occupies this last stage, as will be shown hereinafter, and enters the first stage of register 63 in decoded form during the subsequent shift in the registers.

The decoding principle is based on the observation that each one of the combinations of received bits derived from the relation $$(1) \quad p_n = i_n + i_{n-12} + i_{n-18} + i_{n-21} \tag{M}$$

defining the code, through shifting the values of all the indices by a value $j$ causing one of the indices to be equal to $n$ ($j = 0, 12, 18, 21$) supply an expression for $i_n$ or a "replica" of $i_n$; the replicas thus obtained are independent from each other and equal in number to the different indices in relation (1). The code is so chosen that the number of different indices is an even number; it is 4 in the present case.

Clearly, all these replicas would be equal if all the bits used were received without error.

In addition to the four aforementioned "composite" replicas of bit $i_n$, there is obtained a simple replica of bit $i_n$, i.e. the corresponding received bit $i'_n$.

For a bit $i_n$, therefore, they are a simple replica $r_n$ and four composite replicas $r_n(j)$ the five replicas being, noting that in modulo 2 algebra the + sign and the − sign are interchangeable:

$$\begin{aligned} r_n &= i'_n \\ r_{n(0)} &= i'_{n-12} + i'_{n-18} + i'_{n-21} + p'_n \\ r_{n(12)} &= i'_{n+12} + i'_{n-6} + i'_{n-9} + p'_{n+12} \\ r_{n(18)} &= i'_{n+18} + i'_{n+6} + i'_{n-3} + p'_{n+18} \\ r_{n(21)} &= i'_{n+21} + i'_{n+9} + i'_{n+3} + p'_{n+21} \end{aligned} \tag{M}$$

The expressions for the replicas of $i_n$ include received bits having a subscript less than $n$, the decisions for which, therefore, have been taken before the decision for $i_n \cdot i'''$ denotes the value attributed to a bit $i$ after decoding. The decision on $i_n$ should preferably be based on the thus-estimated values rather than the received values of the bits.

Accordingly, the replicas are:

$$\begin{aligned} r_n &= i'_n \\ r_{n(0)} &= i''_{n-12} + i''_{n-18} + i''_{n-21} + p'_n \\ r_{n(12)} &= i'_{n-12} + i''_{n-6} + i''_{n-9} + p'_{n+12} \\ r_{n(18)} &= i'_{n+18} + i'_{n+6} + i''_{n-3} + p'_{n+18} \\ r_{n(21)} &= i'_{n+21} + i'_{n+9} + i'_{n+3} + p'_{n+21} \end{aligned} \tag{M}$$

When a bit $i'_n$ forming the simple replica of a bit $i_n$ is written in the last stage of register 61, the output of the same supplies the simple replica.

The corresponding composite replicas should be formed at the same instant. To this end, as can be seen by referring to expressions (3), use is made of the auxiliary outputs of the 1st, 4th, 10th, 13th, 16th and 19th stages of register 64, the 3rd, 6th, 9th, 12th, 18th and 21st stages of register 63, and the 1st, 4th, 10th and 22nd stages of register 62.

These outputs supply a group 24 of four modulo 2 adders, so that the four adders supply the four composite replicas respectively. To simplify the drawing, this group of four adders has been represented by a single unit having four outputs forming the four composite replicas of bit $i_n$ when the last stage of register 61 supplies a simple replica.

The simple replica and the four composite replicas are supplied to five inputs 91 – 95 of the computer 6 which also has an input 96 connected to the last stage of register 63 and a triple input 69 connected to the last group of parallel stages of the register assembly 67.

A binary output 66 of computer 6 is connected to the input of register 63, to which it supplies the $i''$ bits.

A triple output 65 of computer 6 is connected to the first group of parallel stages of the register assembly 67.

Computer 6 has two synchronisation inputs 71, 76 and a control input 82 connected to an output 82 of the control circuit 8.

In the case of a prefix bit or a continuation message bit, the value $i''_n$ attributed by computer 6 involves only the 5 replicas of $i_n$.

In the case of a repetition message bit, the value $i''_n$ attributed by computer 6 involves the five replicas of $i_n$, the decoded bit $i''_{n-25}$ ($i_{n-25}$ in this case corresponding to the same message bit $I_m$ as $i_n$) and the corresponding value $V_{n-25}$ which is dependent on the amount of agreement between the replicas which have been used to decide on the value to be given to $i''_{n-25}$. The calculations will be given in detail during the description of computer 6.

Station B also comprises a "prefix circuit" 100 used for identifying the prefix and evaluating the channel quality. Circuit 100 has three inputs 130, 230 and 330 which receive the values V written in the first three groups of stages in the register assembly 67, and three inputs 631, 632, 633 which receive the bits written in the first three stages of register 63. The circuit has two synchronisation inputs 73, 76 and two outputs 101 (prefix identification) and 102 (channel quality) connected to two corresponding inputs 101, 102 of control circuit 8.

A return signal transmitter 136 has one input connected to an output 85 of control circuit 8, and one synchronisation input 74.

A data receiver R, adapted to be fed by station B, has also been shown; unit R may have an output 29, connected to a corresponding input 29 of control circuit 8 and supplying a signal (29) at level 1 or 0 depending upon whether the receiver is available or not (the latter case may occur e.g. if receiver R is in turn supplying a chain of relays). In the present example, it will be assumed that output 29 is present. Receiver R has a data input 30, a clock input 78 and an auxiliary input 70.

The rest of the circuit in FIG. 4, more particularly the other connections of the control circuit 8, will be described at the same time as its "normal" operation, which is defined by the following conditions:

1. Receiver R is always available.
2. The prefix received during the $p^{th}$ cycle always corresponds to the return signal transmitted during the $(p-1)^{th}$. The contrary case as has been seen, occurs in the case of a first continuation request signal received after the repetition counter at station A has been saturated. It may also occur if the return signal has not been correctly interpreted at station A.

"Abnormal" modes of operation will be discussed during the description of the control circuit 8.

During "normal" operation, at instant 0 of the $p^{th}$ cycle, according to the way the registers are fed and shifted, the 22 message bits of the $(p-1)^{th}$ train received during the $(p-1)^{th}$ cycle occupy the 22 stages of register 61 whereas the 25 decoded bits corresponding to the previous information bits occupy register 63. Between instants 1 and 23 of the $p^{th}$ cycle, depending on the prefix of the $(p-1)^{th}$ train, input 82 of computer 6 receives a signal 0 or 1, the signal 0 indicating that the decoding required is continuation decoding, and the signal 1 requiring repetition decoding; signal (82) is always 0 at other times. A bit is decoded and the associated value V is calculated in less than 1 time unit.

The bit which has been written in the last stage of register 61 is decoded between $t = 1$ and $t = 2$, but the corresponding value $i''$ and the associated value V do not enter register 63 and register assembly 67 until instant 2, constituting the first register feed during the $p^{th}$ cycle. Accordingly, the message bits of the $(p-1)^{th}$ train are successively decoded and transmitted to register 63, the last bit entering the register at instant 23.

If the return signal of the $(p-1)^{th}$ cycle was not a request to repeat the message, a signal (84) supplied by an output 84 of control circuit 8 is at level 1 between instants $t = 2$ and $t = 24$ and is applied to the first input of an AND gate 77 whose second input is connected to the output 66 of computer 6 and whose output is connected via an OR gate 40 to the data input 30 of the data receiver R, which thus receives the decoded message bits at the same time as they are written in register 63. The reception is synchronised in the following manner. The synchronisation input 78 of receiver R is connected to the output of an AND gate 68 whose first input 71 receives the pulses (71) at the frequency of the bits, supplied by generator 7, and whose second input, via an OR gate 79, receives signal (84). Accordingly, the trailing edges of pulses (71) (instants 2.5 etc. up to 23.5) can be used for writing in the receiver R.

If there was a request for a repetition, signal (84) is at level 0 and the decoded message bits of the $(p-1)^{th}$ train are not transmitted to receiver R.

Between $t = 23$ and $t = 26$, the signal (82) supplied by circuit 8 to computer 6 is always at level 0.

It is now necessary to decode the three prefix bits of the $p^{th}$ train, the first of which has entered the first stage of register 61 at instant 2 and the last stage of register 61 at instant 23.

From instant $t = 26$, the three decoded prefix bits occupy the first three stages of register 63 and the shifts in the registers interrupted; the 22 message bits of the $p^{th}$ train then occupy the 22 stages of register 61.

Between instants $t = 26$ and two instants $t_1$ and $t_2$, both previous to $t = 26.5$, circuit 100 identifies the prefix and evaluates the channel quality in dependence on the prefix reception quality and, if required, the quality of reception of the previous prefixes.

The corresponding signals appear at its outputs 101, 102 respectively during time intervals including instant 26.25. At this instant they are recorded in control circuit 8 and stored there until the instant 26.25 of the following cycle.

The control circuit 8 uses signals 101 and 102, which have thus been stored at instant 26.25 of the $p^{th}$ cycle to provide:

1. A signal 85 which determines the nature of the return signal transmitted by transmitter 136 between instant 26.5 and instant 30.5 of the $p^{th}$ cycle.

During normal operation, signal (85) has bthe same value as signal (102), value 1 producing a request for continuation if signal (102) indicates that the channel quality is good, and value 0 producing a request for repetition in the contrary case. The corresponding transmission is triggered in transmitter 136 by the trailing edge of pulse (74) applied thereto.

2. The aforementioned signal (82) which, between instant 1 and 23 of the $(p+1)^{th}$ cycle, determines the nature of the decoding performed in computer 6. In both normal and abnormal operation, signal (82) depends only on the recorded signal (101).

3. The aforementioned signal (84), which is provided between instants 2 and 24 of the $(p+1)^{th}$ cycle in order to determine whether the decoded bits will or will not be provided to receiver R. During normal operation, its value is the same as that of the recorded signal (102).

FIG. 4 also shows the following components, which are used for "abnormal" operation of the station: An output 83 of circuit 8 is connected to the second input of AND gate 79 and to the auxiliary input 70 of receiver R. An AND gate 39 has a first input connected to output 83 of circuit 8, a second input connected to the output of register 63, and an output connected to the second input of OR gate 40.

Computer 6 will now be described at the same time as the principles of the calculation giving the values of the decoded bits and the corresponding values V. will be set forth. Prefix circuit 100 bill be described at the same time as the channel quality criteria will be specified; and the control circuit 8 will be described at the same time as the "abnormal" modes of operation of station B will be set out.

FIG. 6 is a diagram of computer 6 from FIG. 1. All the store, register, and trigger components in the circuit which will be described hereinafter are provided with zero resetting inputs, and are reset to zero by the trailing edge of the pulses (71), at the frequency of the bits, supplied to input 71 of computer 6, except for an element 615 which is reset to zero by the leading edge of the same pulses, slightly delayed, as will be explained hereinafter. In order to not overload the drawing, the zero resetting inputs and the corresponding connections to input 71 have not been shown.

Basically, the calculation is as follows:

a. Continuation decoding (equally applicable to all the prefixes):

A simple method of using the replicas is to attribute the same importance to each of them.

The sum $S_n$ is formed of the five replicas of a considered bit $i_n$. If the replicas were all accurate, this sum would be equal to 5 or 0, depending on whether the bit to be decoded had the value 1 or 0.

The sign of the difference $5/2 - S_n$ or (which comes to the same thing) the sign of the difference $D_n = 5 - 2 S_n$ is thus taken as a criterion to assign a bit $i_n$ a decoded value $i''_n$ which is equal to 1 or 0 depending on whether $D_n = 5 - 2 S_n$ is negative or positive.

The aforementioned value $V$ is taken equal to $V_n = \frac{1}{2}(|D_n| - 1)$ the value of which increases in proportion to the closeness of agreement of the replicas, but is not used to decode the information bit in question.

b. Repetition decoding.

1. Calculation of $d_n = 5 - 2 S_n$

This is the same value as that denoted by $D_n$ in the case of continuation decoding. In the present case, however, its sign does not determine the value of $i''_n$ and therefore a different notation ($d$ instead of D) is used, D in all cases being the difference whose sign determines the value to be given to the corresponding bit, and also being the value in the expression for V.

2. Calculation of $D_n$, which is taken equal to $d_n + 2 V_{n-25}$ if $i''_{n-25} = 0$ and to $d_n - 2 V_{n-25}$ if $i''_{n-25} = 1$. The absolute value of $D_n$, being however, limited to 15.

In this case, $D_n$ has the following meaning;

It will be recalled that if $i_n$ is a message bit, of a repetition bit train, it corresponds to the same message bit $I_m$ as the bit $i_{n-25}$.

First, it will be assumed that the repetition is the first one.

For $I_m$, there were obtained 5 replicas of $i_{n-25}$ leading to a difference $D_{n-25} = 5 - 2 S_{n-25}$, and 5 replicas of $i_n$ leading to a difference $d_n = 5 - 2 S_n$; in order to make use of the two results, it is natural to form the cumulative difference $$+ d_n + D_{n-25}$$

Now $V_{n-25} = \frac{1}{2}(|D_{n-25}| - 1)$. Therefore $|D_{n-25}| = 2 V_{n-25} + 1$. And $D_{n-25} = 2 V_{n-25} + 1$ if $i''_{n-25} = 0$ and $-(2 V_{n-25} + 1)$ if $i''_{n-25} = 1$.

Thus $d_n + D_{n-25} = d_n \pm (2 V_{n-25} + 1)$; this expression has the disadvantage of being even ($d_n$ being odd). Indetermination could therefore occur. For this reason the expression $D_n = d_n \pm 2 V_{n-25}$ is substituted therefor, the sign preceding $2 V_{n-25}$ being "+" or "−" depending on whether $i''_{n-25} = 0$ or 1.

The sign of $D_n$ determines the value of $i''_n$ (0 when $D_n$ is positive, 1 when $D_n$ is negative) and there is associated therewith a cumulative value $V_n$, $V_n = \frac{1}{2}(|D_n| - 1)$, which can be used in the case of a second repetition, and so on.

Since the number of repetitions is not limited, maximum values must be assigned to D and V. In this example, D is limited to 15 consequently V is limited to 7.

In all case, in order to decode a $i_n$ bit, the computer must compute $5 - 2 S_n = (5 - S_n) - S_n$.

$S_n$ is the number of replicas having the value 1 and $5 - S_n$ is the number of replicas having the value 0.

For this calculation, use is made of an up − down counter 615 having 5 binary stages (FIG. 6) which is reset to zero as described hereinafter and whose count increases by one for each replica having the value 0 and decreases by one for each replica having the value 1.

In the case of repetition decoding, rapid pulses, equal in number to $2 V_{n-25}$, are subsequently added to the "+" or "−" input of the counter, depending on whether $i''_n - 25$ is equal to 0 or 1.

A five-stage up - down counter of the aforementioned kind can without ambiguity effect algebraical sums equal to not more than 15 in absolute value, the maximum chosen for D.

If, therefore, $N_5$ denotes the number finally recorded by the counter, $N_5 = D_n$ or $D_n + 32$ depending on whether $D_n$ is positive or negative.

Under those conditions, it can easily be shown that if $D_n$ is less than 15

1. At the end of the operations, the bit recorded in the 5th stage of the counter is 1 if $D_n$ is negative, and 0 if $D_n$ is positive. Accordingly, this stage contains $i''_n$.

2. The number $N_{234}$ formed by the digits written in the 2nd, 3rd, and 4th counter stages is equal to $V_n$ if $D_n$ is positive and to the complement of $V_n$ if $D_n$ is negative (a number is a complement of another number if each digit 1 of the first number corresponds to a digit 0 in the second number and vice versa).

In all cases, therefore $V_n$ will be formed at the outputs of 3 modulo 2 adders 644, 645, 646 whose first inputs are respectively connected to the outputs of the 2nd, 3rd and 4th stages of the counter and whose second inputs are connected to the output of the last stage.

On the other hand, since $V_n$ and $D_n$ increase together and $D_n$ is 15 when $V_n = 7$, the last-mentioned threshold value of V is used to stop up or down counting.

To this end, the outputs of the three modulo 2 adders 644, 645, 646 supply the three inputs of an AND gate 647 whose output is used to stop the supply of pulses to the counter, by a method which will be specified hereinafter.

There will now be described the additional computer elements for performing the aforementioned operations with the desired synchronisation.

It will be recalled that the input 71 supplies pulses at the bit frequency at the instants $t = k$, $k$ being an integer, and input 76 supplies a train of 20 fast pulses having a short duration, $h$, the leading edges of which appear at the instants $k + 0.01, k + 0.02 \ldots k + 0.20$.

It will be assumed that the value of $k$ is determined; so is then the subscript $n$ of the information bit entering the last stage of register 61 at the instant $k$ of the cycle considered. For simplification, instant k will be taken as a new time origin.

Up to instant 1, therefore, the five inputs 91 – 95 supply the computer with the five replicas of $i_n$, whereas its input 96 supplies $i''_{n-25}$ and its input 69 supplies $V_{n-25}$.

The operations are programmed by a 6-stage shift register 614, in the first stage of which a digit 1 is written under the action of the leading edge of the first pulse (76). The digit subsequently moving forward one stage for each of the five following pulses.

To this end, the input of the first stage of the register is connected to the complementary output 625 of a trigger circuit 613. Circuit 613 which, as already indicated, is reset to zero at the instant 0, also has an input "1" connected to the complementary output 625 and an input H authorizing the change to state 1, input H being sensitive to the trailing edge of the pulses applied thereto and being connected to the circuit input 76.

The clock input H of register 614 is connected to circuit input 76 through an AND gate 622 whose second input (an inverting input) receives the output signal of the 6th stage of the register. The clock input is sensitive to the leading edge of the pulses applied thereto.

At the instant 0, trigger circuit 613 is put into the state 0 and its complementary output 625, thus supplies a signal 1 which is applied to the input of the first stage of register 614 and which is recorded there at the instant 0.01; signal 1 is also transmitted to input "1" of trigger circuit 613, which changes into the state 1 at the instant $0.01 + h$, $h$ being the duration of a pulse (76), and remains in the same state until reset to zero at instant 1, until which time its input "1" receives a zero signal, thus converting to zero the signal applied to the input of register 614. Digit 1 moves forward in the register, at the same rate as the clock pulses applied to register input H, until it reaches the 6th register stage (at instant 0.06) after which gate 622 cuts off the feed of pulses to register input H. $U_1, U_2 \ldots U_6$ will designate the time intervals corresponding to the presence of digit 1 in each of the successive register stages.

FIG. 7 shows, in dependence on time, the beginning of a pulse (71), the corresponding pulse train (76) and the signal (625) supplied by the complementary output 625 of trigger circuit 613.

The external outputs of the five first stages of register 614 are connected to the first inputs of five AND gates 331 – 335 whose second inputs receive the five replicas of bit $i_n$ applied to the computer inputs 91 – 95. The output of the 6th register stage and computer input 96 (which supplies it with $i''_{n-25}$ when input 91 supplies $i'_n$) are connected to the two inputs of an AND gate 336.

The outputs of gates 331 – 336 are connected to corresponding inputs of an OR gate 630 whose output supplies in parallel an inverting input of an AND gate 637 and an input of an AND gate 638; the second inputs of AND gates 637 and 638 are connected to the output of an AND gate 639 having two inputs, the first of which is an inverting input. The second input of AND gate 639 is connected to circuit input 76 via a delay element 640. As will be shown hereinafter, the inverting input of gate 639 cannot receive a signal 1 until the computer has finished operation. It should thus be understood that this input receives a zero signal until stated otherwise.

The output of AND gate 639 transmits the delayed synchronisation pulses (76), starting from the first pulse and until the gate 639 is blocked on its inverting input.

AND gates 331 – 336 are successively unblocked via their inputs connected to the outputs of the stages of register 614. Consequently, the output of OR gate 630 assumes a state which in succession is the state of inputs 91 – 96.

The output of AND gate 637 is connected to the "+" input of the five-stage up - down counter 615, whose "−" input is connected to the output of AND gate 638.

The counter responds to the leading edges of the pulses applied thereto.

The delay introduced by delay element 640 is such that a pulse (76) has produced a shift on register 614 before it is applied through elements 640 and 639 to AND gates 637 and 638.

Consequently, counter 615 positively counts each of the 6 replicas of $i_n$ having the value 0 and negatively counts each replica having the value 1, the operation being terminated when the delay device 640 has transmitted five pulses (76) to the counter.

Counter 615 must then stop being fed in the case of continuation decoding corresponding to the level 0 of signal (82) applied to circuit input 82 (this is always the case for the first train received after the system is put into operation).

To this end, a gate 641 receives the output signal of the 6th stage of register 614 on one input and the signal (82) on its second, or inverting input.

Through an OR gate 642, the signal of gate 641 is applied to the inverting input of gate 639, which thereafter prevents any further change in the count in counter 615.

In the contrary case, operations are continued during time interval $U_6$ by the following circuit:

An AND gate 629 having four inputs is used to supply a four-stage auxiliary binary counter 616, with pulses (76).

To this end, gate 629 comprises a first, inverting, input receiving the same end-of-operations signals as the inverting input of gate 639; a second input receives the output signal of the 6th stage of register 614; a 3rd input receives the signal (82) and a 4th input receives the pulses (76) delayed by the delay device 640.

Counter 616 counts pulses (76), starting from the 6th, until the end-of-operations signal 1 appears; in all cases this signal is supplied by the output of OR gate 642.

The outputs of the 2nd, 3rd and 4th stages of counter 616 are connected to the first triple input of a comparator 643 whose second triple input is connected to the triple input 69 of the computer 6, shown in FIG. 6 by the three wires 691, 692 and 693 in the order of increasing weight of the corresponding digits.

In comparator 643, the number P formed by the digits written in the last three stages of register 616 (the weight of the digits increasing with the position number of the stage) is compared with the number V (more precisely $V_{n-25}$) and a level 1 signal is supplied if these two numbers are equal.

It will be noted, that if Q denotes the four-digit number written in counter 616, $Q = 2P$ or $2P+1$ depending on whether the first stage of the counter contains 0 or 1. It has been seen, however, that the values V are integers, so that the values of 2V are even.

Therefore, a detector output signal indicates that $Q = 2V$. Until this output signal appears, counter 615 counts up or down (depending on the value of bit $i'\lambda'_{n-25}$) a number of pulses equal to the number of pulses applied to counter 616.

This state of affairs may end in two ways. Firstly, if counter 615 is not saturated, it may be ended by the detector output signal. In this case, gates 629 and 639 are simultaneously blocked by the detector output signal transmitted by OR gate 642.

Alternatively, the state of affairs may be ended if the counter 615 is saturated, this result being obtained by connecting the output of gate 647 to a 3rd input of OR gate 642.

Accordingly, output 66 delivers $i''_n$ and triple output 65, comprising the outputs of adders 644, 645 and 646, delivers $V_n$ not later than the instant 0.19.

Since these values must be recorded at the instant 1, or $k+1$ if the previous time origin is again considered, it will be seen that counter 615 must be reset to zero later than the other store elements in the computer, i.e. by the leading edges of pulses (71) which have been slightly delayed by a delay device so that zero resetting is performed after the leading edge of pulse (71) and before the leading edge of the first delayed pulse (76) supplied by the delay device 640.

FIG. 8 illustrates an embodiment of circuit 100 in FIG. 4.

In FIG. 8, the two synchronisation inputs are shown again. Those are input 73 which supplies pulses covering the time intervals 26 to 26.3 in each cycle, and input 76, which supplies the fast pulse trains.

The operations are programmed by a five-stage shift register 881 which is reset to zero at the instant $t = 26.3$ of each cycle at its Z sinput connected to input 73, via the NOT circuit 874.

An AND gate 884 has three inputs, the first being connected to input 73, the 2nd to input 76, the 3rd (an inverting input) to the output of the 5th stage of register 881. The output of gate 884 is connected to the register clock input H, which is sensitive to the leading edges of the pulses applied thereto. The input of the first register stage is connected to the output of an AND gate 888 whose first input is connected to a source 880 permanently supplying level 1 and whose second input (an inverting input) is connected to the output of an OR gate 886. OR gate 886 is directly connected to the outputs of the last two stages of the register and, through another OR gate 885, to the outputs of the first three stages of the register. Consequently, the first rapid pulse (76) following the leading edge of pulse (73) will cause the digit 1 to be written in the first register stage, and digit 1 will subsequently move forward one stage in the register for each of the following rapid pulses, until it reaches the last stage.

Let $\theta_1$, $\theta_2$, $\theta_3$, $\theta_4$ and $\theta_5$ denote the time intervals during which the digit 1 written in register 881 occupies the 1st, 2nd, 3rd, 4th and 5th stage thereof.

An adder 873 is reset to zero at the instant 26.3 of each cycle, at its Z input connected to the output of NOT circuit 874, itself connected to the synchronisation input 73. Adder 873 identifies the decoded prefix of each train, comprising digits denoted by $P''_1 P''_2$, $P''_3$, by effecting the sum $P''_1 + \overline{P''_2} + P''_3$ ($\overline{P''_2}$ denoting the complementary digit of $P''_2$). This sum is nominally equal to three for the continuation prefix 101 and to 0 for the repetition prefix. It will therefore be assumed that there is a continuation prefix if the sum is 3 or 2, and a repetition prefix if the sum is 1 or 0. In other words, the nature of the prefix is directly given by the heaviest-weight bit in the sum. Adder 873 adds the bits applied to its bit input to its previous contents, when a control pulse is applied to its control input 801. Its bit input is connected to the output of a switching circuit 500 having three inputs respectively connected to circuit inputs 631, 632 and 633. Circuit 500 has three control inputs connected to the outputs of the 1st, 2nd and 3rd stage of register 881. It applies bit $P''_1$ to the adder during time interval $\theta_1$, bit $P''_2$ during the time interval $\theta_2$ and bit $P''_3$ during the time interval $\theta_3$. The circuit can comprise three AND gates whose first inputs are connected to inputs 631, 632 and 633 respectively, the first input of the AND gate connected to input 632 being an inverting input, whereas the 2nd inputs of the AND gates are connected to the outputs of the 1st, 2nd and 3rd stage respectively of register 881, and their outputs supply an OR gate whose output forms the output of the switching circuit.

Successive additions are made under the action of the leading edge of the first three slightly-delayed pulses (76), the pulses being obtained as follows:

Gate 884, acting via a delay device 894, supplies the first input of an AND gate 890 whose second input receives the output signal from OR gate 885 and whose output is connected to the control input 801 of adder 873.

With the 3rd control pulse, adder 873 delivers the prefix identification signal (101) at its output, which forms the prefix circuit output 101. Signal (101) has the value 1 for a continuation prefix.

A second adder 810 effects the sum $D_s$ of the differences $|D|$ relative to the three prefix bits, which for simplicity will hereinafter be called $|D_1|$, $|D_2|$, $|D_3|$. As pointed out, the value of D increases with the amount of agreement between the replicas. On the other hand, $|D| = 2V + 1$. In other words, a number $|D|$ can be formed from V by doubling the weight of the bits expressing V and by adding the unit 1 to complete the thus obtained number.

The values V relating to a prefix bit are always obtained by continuation decoding and therefore cannot exceed 2. It is therefore unnecessary in the present case to use the heavyweight bit expressing V, and therefore only two wires of each the multiple inputs 130, 230 and 330 in FIG. 4 have been shown. Inputs 131 and 231, 132 and 232, 133 and 233 in FIG. 8 give the bits having the weight 1 and 2 of numbers $V_1$, $V_2$ and $V_3$ supplied at the triple inputs 130, 230 and 330 in FIG. 4.

Adder 810 has three inputs 811 – 813 adapted to receive, in the order of increasing weight, the bits of the numbers successively denoting $|D_1|$, $|D_2|$ and $|D_3|$. Apart from the fact that it operates on three-bit input numbers, it operates in the same manner as adder 873, its control input 901, and its zero-resetting input Z receiving the same signals as adder 873; its bit input 811 (weight 1) is connected to the output of source 880 supplying the level-one signal. Its input 812 (weight 2) is connected to the inputs 131, 132, 133 supplying the weight-1 bits of the values $V_1$, $V_2$, $V_3$ associated with bits $P'''_1$, $\overline{P''_2}$ and $P''_3$, via a switching circuit 501 which is identical with circuit 500 except that none of the AND gates has an inverting input, input 812 receiving the same control signals as circuit 500. Finally, input 813 (weight $2^2 = 4$) is similarly connected to the inputs 231, 232, 233 supplying the weight-2 bits of values $V_1$, $V_2$ and $V_3$ via a switching circuit 502 identical with circuit 501 and receiving the same control signals.

The sum $D_1 + D_2 + D_3$ is at the most equal to 15 (for this value, the five replicas are identical for each of the three bits). Consequently, adder 810 has four outputs 821, 822, 823, 824 supplying the four bits of the numbers forming the sum, in order of increasing weight.

In the present embodiment, the following quality criterion is adopted : In the case of a continuation prefix, the sum must exceed 12 (an average of four identical replicas for each of the three bits). In the case of a repetition prefix the requirements cannot be so high, and the channel quality is evaluated allowing for the reliability provided by the repetitions. In the latter case, therefore, sums $D_s$ are used which have accumulated since the first transmission of the same message.

These operations are performed using another adder 830 whose zero-resetting input Z receives the output signal of adder 873 through an AND gate 895 which receives the output signal of the fourth stage of register 881, so that the adder is reset to zero at the end of the time interval $\theta_4$ if the decoded prefix is a continuation prefix, but is not reset in the contrary case. The four outputs of adder 810 are connected to the four bit inputs 831 – 834, in the order of increasing weight, of adder 830 through four AND gates 875 – 878 whose second inputs receive the output signal of the 5th stage of register 881. Adder 830 makes only one addition, i.e. adds the number set up at its bit inputs to its previous contents (which is zero in the case of a continuation prefix). The addition, under the control of the output signal of the 5th stage of register 881, is performed unless the previous contents of adder 830 already exceeds 12. To this end, the control input 530 of adder 830 is connected to the output of the 5th stage of register 881 through an AND gate 889.

The other input of gate 889 is an inverting input which, as will be seen later, receives the signal 1 if the previous contents of the adder is already 12.

Adder 830 has five outputs 841 – 845 which, in the order of increasing weight, supply the five bits of the number expressing the sum resulting from the last addition process. This number is greater than 12, either if the weight-16 bit appearing at output 845 is equal to 1, or if the weight-8 and weight-4 bits are both equal to 1 and eitheir the weight-2 bit or the weight-1 bit is also equal to 1. Consequently the circuit for detecting when the threshold has been passed is as follows an AND gate 893 has three inputs, the first two of which are connected to adder outputs 844, 843 and the third of which is connected to the output of an OR gate 892, the two inputs of gate 892 being connected to outputs 841 and 842. The output of gate 893 and output 845 of adder 830 are connected to the two inputs of an OR gate 887 whose output forms the circuit output 102.

The output of gate 887 is also connected to the inverting input of AND gate 889.

FIG. 9 is a diagram of the control circuit 8, which comprises three trigger circuits 768, 773 and 776 each having a "1" input, a "0" input and an clock input H connected to the synchronisation input 74 of the circuit.

The H inputs of the three trigger circuits are sensitive to the leading edges of the pulses applied thereto.

These three circuits are adapted to record the following signals respectively : (101) showing the nature of the prefix, (102) showing the channel quality and (29) showing whether the receiver is available, the signals being applied to the corresponding inputs of the circuit.

To this end, inputs "1" and "0" of trigger circuit 768 are connected to input 101, the first directly and the second through a NOT circuit 796; inputs "1" and "0" of trigger circuit 773 are connected to input 102, the first directly and the second via a NOT circuit 797; and inputs "1" and "0" of trigger circuit 776 are connected to input 29, the first directly and the second through a NOT circuit 795.

Write-in in these trigger circuits is performed at the instant 26.25 of each cycle. It has been seen that at this instant, the signals (101) and (102) produced during the cycle are already available at inputs 101 and 102.

The receiver-available signal (29), indicating, if is equal to 1, that the receiver R can still record at least 22 bits, is also available at the instant 26.25 occurring after the instant 23.5 when the receiver has just recorded a message.

The signal (82) for controlling the nature of the decoding operation and sent to computer 6 (FIG. 4) is obtained. at output 82 of an AND gate 783 whose first input (an inverting input) is connected to the output of trigger circuit 768 and whose second input receives the square signal (77) lasting from $t = 1$ to $t = 23$.

A trigger circuit 777 is similar to the preceding three, its clock input H being likewise connected to circuit input 74. As will be seen, starting from instant $t = 26.5$ of the $p^{th}$ cycle, it supplies the return signal transmitted during the $(p-1)^{th}$ cycle and maintains the same state until instant 26.5 of the $(p+1)^{th}$ cycle. (It is put into state 1 by means (not shown) when the system is put into operation, i.e. on reception of the first train, which will be a continuation train).

The output of trigger circuit 768 is connected to the first inputs of the two AND gates 769 and 770, the second input of gate 769 being an inverting input. The output of trigger circuit 777 is connected to the second inputs of the same two gates. Between instant $t = 26.5$ of the $p^{th}$ cycle and $t = 26.5$ of the $(p + 1)^{th}$ cycle, a level-1 signal at the output of eitheir gate indicates that the bit train received during the $p^{th}$ cycle is a continuation bit train, received following a continuation request if it appears at the output of gate 770, and following a repetition request if it appears at the output of gate 769, the second case being a case of abnormal operation giving rise to an emergency procedure for supplying the data receiver R (FIG. 4).

A continuation request signal should be transmitted during the $p^{th}$ cycle if, starting from the instant 26.5, the following conditions are fulfilled: a level 1 of the signal (102) denoting a good-quality channel, a level 1 of the signal (29) denoting that the receiver is available, and level 0 of the output signal of gate 769.

Consequently there are three connections to an AND gate 779 having three inputs, the first two of which are connected to inputs 29 and 102, and the 3rd (an inverting input) is connected to gate 769. The output of gate 779 constitutes output 85 of circuit 8 which, from instant $26.25 + \epsilon$ in the $p^{th}$ cycle ($\epsilon$ corresponding to the triggering time of trigger circuits 768, 773 and 776) supplies the level which determines the nature of the return signal transmitted during the $p^{th}$ cycle. The "1" and "0" inputs of trigger circuit 777 are connected to the output of gate 779, the first directly and the second through a NOT circuit 999. Clearly, therefore, trigger circuit 777, at the instant 26.25 of the $p^{th}$ cycle, records the signal (85) which has determined the nature of the return signal transmitted during the $(p-1)^{th}$ cycle.

Signal (85) is applied to transmitter 136 (FIG. 4) where the transmission of the proper return signal, depending upon the level of signal (85), is triggered by the trailing edge, which appears at instant 26.5, of pulse (74) which is also applied to the transmitter.

Signal (84) which during "normal" operation will ensure the transfer to the data receiver of the message bits receiverd during the $p^{th}$ cycle and decoded during the $(p+1)^{th}$, must be supplied in the case where the return signal transmitted during the $p^{th}$ cycle is a continuation request signal, "normal" operation implying that the corresponding message bits have not already been transferred to receiver R.

Accordingly, signal (84) is obtained in the following manner;

A trigger circuit 780 has a "1" input connected to the output of gate 770 and a "0" input, both being sensitive only to the 0—1 transitions of the signals applied thereto. An AND gate 781 receives the output signal of trigger circuit 780 and the output signal of gate 779, its output being connected to the "0" input of trigger circuit 780 through a delay element 751, and being directly connected to the "1" input of a trigger circuit 787. The delay element 751 imposes a very short delay. Trigger circuit 787 also has a "0" input connected to the circuit input 74, its two inputs being sensitive to 0—1 transitions, which cannot occur simultaneously at those two inputs.

If $\epsilon$ is the general term used for the triggering time of a trigger circuit, trigger circuit 780 takes the state 1 from the instant $26.25 + 2\epsilon$ of a cycle, e.g. the $j^{th}$ cycle, at which the received train comprise a continuation message (i.e. transmitted for the first time) in response to a continuation request.

The continuation message which caused trigger circuit 780 to flip must be discharged towards receiver R during the $(j+x+1)^{th}$ cycle if a continuation-request return signal is transmitted during the $(j+x)^{th}$ cycle, $x = 0$ or 1 or 2 etc, i.e. if, in accordance with the criteria employed at station B, the message does not need to be repeated ($x=0$) or no longer needs to be repeated ($x > 0$). The corresponding signal is delivered by gate 781 from the instant $26.25 + 2\epsilon$ (if $x = 0$) or from instant $26 + (x > 0)$ of the $(j+x)^{th}$ cycle.

Trigger circuit 787 is returned to or maintained at 0 at the instant 26.25 of each cycle and records signal 1 when the signal supplied by gate 781 changes from 0 to 1, after which, delay device 751 ensuring the necessary time interval, the output signal of gate 781 resets trigger circuit 780 to zero.

The output of trigger circuit 787 is connected to the first input of an AND gate 788 whose second input is connected to circuit input 75 which supplies it with a level 1 square wave signal between the instant 2 and 24 of each cycle. The output of gate 788 forms circuit output 84.

Abnormal functioning occurs in the following cases:
a. receiver 29 is not available and/or
b. a message received during the $p^{th}$ cycle does not correspond to the return signal transmitted during the $(p-1)^{th}$ cycle.

First, it will be assumed that only condition (b) is fulfilled.

This case can be subdivided into two as follows:

b1. A repetition message is received in response to a continuation request. This is provided for by the way in which signal (84) has been produced. This message will not be used to supply the receiver (since trigger circuit 780 has been reset to zero). On the other hand, if the channel quality is still good, another continuation will be requested and operation will again be normal. If the channel quality has become bad, a repetition will be requested and the corresponding message will still be unnecessary, but not transmitted to receiver R.

b2. A continuation message is received during the $p^{th}$ cycle in response to a repetition request transmitted during the $(p-1)^{th}$ cycle.

In this case, the message bits of the $(p-1)^{th}$ train were not supplied to receiver R after decoding during the $p^{th}$ cycle. But, they were stored in register 63 (FIG. 4). They can therefore, for want of a better alternative, be conveyed to receiver R during the $(p+1)^{th}$ cycle, by successively taking them from the last stage of register 63; this is done by means of AND 39 and OR gate 40 (FIG. 4) provided that circuit 8 supplies gate 39 with a level 1 signal (83) between instants 2 and 24; the corresponding synchronisation signals are then supplied to the receiver by means of an OR gate 79, allowing an unblocking of gate 68 by signal (83) as well as by signal (84).

Signal (83) is supplied (FIG. 9) by the output 83 of an AND gate 789 having three inputs and receiving signal (75), the output of signal of gate 769 and the output signal of trigger circuit 776.

The auxiliary input 70 of receiver R must also be supplied with a signal indicating that the data transmitted by this emergency procedure may be faulty; to this end, the same signal (83) is applied to the auxiliary input (70), as shown in FIG. 4.

Finally, it will be recalled that in this case (when a signal 1 is supplied by OR gate 769) a return signal requesting a repetition has been transmitted during the $p^{th}$ cycle, so that signals (83) and (84) can never be present simultaneously.

It will be now be assumed that only condition (a) applies; Receiver R is not available for reception during the $(p+1)^{th}$ cycle. In this case, a repetition must continually be requested until the receiver becomes, available; this is ensured by the way in which signal (85) is produced and operation will return to normal as soon as the receiver becomes available.

Finally, conditions (a) and (b) may occur simultaneously if receiver R is not available and a continuation message is received during a cycle (e.g. the $y^{th}$ cycle) in spite of the repetition request or requests which have been transmitted since receiver R became saturated (this case being very improbable in view of the Draconian conditions imposed with regard to the transmission of a continuation message by station A).

In such a case, the feed of the registers in station B must be stopped during the $(y+1)^{th}$ cycle in order to prevent the message stored during the $y^{th}$ cycle in register 63 from being lost. This result is achieved by the circuit used for supplying the register clock pulses to output 81 of control circuit 8.

An AND gate 791 has three inputs, the first of which receives pulses (71) at the bit frequency, the second of which receives the square signal (72) between $t = 1.5$ and $t = 26.5$ in each cycle, and a 3rd of which (an inverting input) receives a signal which blocks this gate in the case in question. The latter signal is supplied by an AND gate 790 whose first input receives the output signal of gate 769 and whose second input (an inverting input) receives the output signal of trigger circuit 776.

As long as the registers are "frozen", circuit 100 continues to supply the same signals (101) and (102), the return signal constantly demands a repetition, trigger circuit 777 remains in state 0 and gate 769 constantly supplies a signal 1.

If, at instant $t = 26.25$ of the $z^{th}$ cycle, trigger circuit 776 changes into state 1 indicating that the receiver has become available, the registers again receive clock pulses during the $(z+1)^{th}$ cycle and, since a signal 1 is still appearing at output 769 during the $z^{th}$ cycle, the signal transmitted during the $z^{th}$ cycle will be a repetition request, whereas the emergency procedure will be applied during the $(z+1)^{th}$ cycle so that the message recorded in register 63 during the $y^{th}$ cycle can be discharged towards receiver R (FIG. 4).

It will be noted that the case where a repetition train follows a continuation request when receiver R is not available, is solved in the same manner as if receiver R were available.

Figure 10:
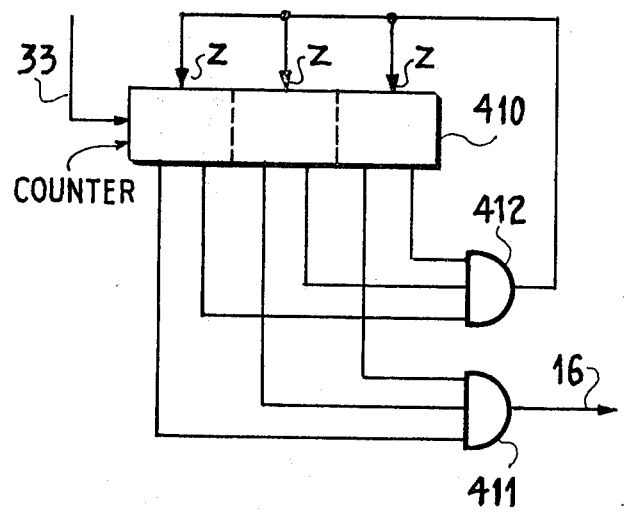
FIG. 10 shows the modifications to be made to the transmitting station.
Figure 11:
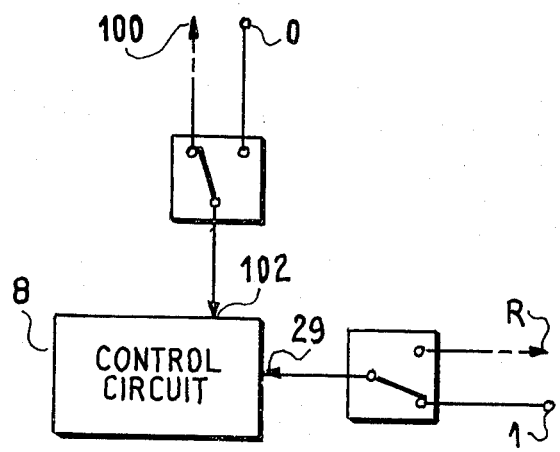
FIG. 11 shows the modifications to be made to the receiving station so that they can operate with systematic repetitions.

FIGS. 10 and 11 illustrate the additions and modifications to be made to station A and station B respectively so that the stations can be used for systematic repetition. For example, each message is transmitted seven times, a first time with the continuation prefix and six times with the repetition prefix, no return signal being involved during the operation.

In this case, receiver 4 and circuit 10 of station A are not used. The connection 16 previously used as an output of circuit 10, is now fed by a circuit which comprises a threestage binary counter 410 receiving the pulses (33) from the timing circuit 3; it will be recalled (FIG. 5) that pulses 33 appear at instant 31.5 of each cycle and have a duration of 0.25.

Each stage has a normal output delivering the signal corresponding to the state of the stage, and a complementary output. The complementary outputs of the three counter stages supply the three inputs of an AND gate 411 which supplies a signal 1 when count of the counter is 0, and the normal outputs of the three stages supply the three inputs of an AND gate 412 whose output is connected to the zero-resetting inputs Z of the three stages. The output of AND gate 411 is connected to the connection 16.

The counter changes state for the leading edges of pulses (33). When its count is 0, output 16 supplies a signal 1. When a pulse (33) is supplied, the count becomes 1 whereas output 16 supplies a zero signal. With the 7th pulse (33), the counter sets up 111, i.e. 7 in decimal notation, and is immediately reset to zero, and so on. Consequently the signal obtained at output 16 can perform the same function as the signal obtained previously with circuit 10, i.e. control gates 14, 28 and 129 and circuit 23 (FIG. 1) at the desired instants.

Apart from adding the circuit in FIG. 10, the only modification to be made to station A is to supply a switch which can selectively connect this circuit or circuit 10 to the same output. The modifications required for station B can be based on the following simple principle:

Any message received will (ficticiously) be assumed to follow a repetition request and to give rise to a repetition request.

As long as the message is actually preceded by the repetition prefix, the procedure will be the same as was the case with the circuit of FIG. 4. When a message received during the $p^{th}$ cycle is preceded by the continuation prefix, the previous message, which has been decoded by the cumulative procedure, will be discharged from register 63 to receiver R, using the emergency procedure.

The following modifications are to be made to the circuit, compared with FIG. 4. A signal 1 is permanently applied to input 29 of control circuit 8, since the proposed method of operation has no point unless receiver R is always available. There is no further need for input 70 of receiver R (showing the risk of error).

On the other hand a signal 102 of value 0 (poor channel quality) is maintained at input 102 of control circuit 8.

The only components of the prefix circuit used are those required for producing the signal (101) indicating the nature of the prefix, i.e. adder 873 and the components which directly or indirectly supply its input signals.

With regard to the control cirucit in FIG. 9, only those components are used which are necessary for producing signals 81, 82, 83 and 85, as concerns the latter, because of the part it plays in the operation of trigger circuit 777.

FIG. 11 symbollically illustrates the two methods of supplying inputs 29 and 102 of control circuit 8, depending on the chosen manner of operation.

Of course, stations A and B could be designed solely for operation with systematic repetitions. The required simplifications are within the scope of those skilled in the art.

Whatever embodiment is considered, the invention can easily be applied to the case where a number m 1 of parity bits are associated with each information bit. In such a case, register 9 of station A (FIG. 1) supplies m modulo 2 adders which simultaneously supply the m parity bits associated with a single information bit.

Station B must then be provided with m registers for storing the received parity bits so as to prepare replicas which can be obtained from the m parity bits associated with each information bit.

In that case the length of the code is derived from that one of the relations defining the code in which the maximum difference between two indices is the highest among those maximum differences, unity being added to this highest of the maximum differences for obtaining L.

It will be appreciated that the use of continuation and repetition prefixes for identifying the received bit trains has this advantage that it is also a convenient means for appreciating the channel quality, but that is is by no means a necessary condition for implementing the invention.

For instance, where return signals are used, the received bit trains could be identified by assuming that a received bit train corresponds to what was requested, the corresponding request being stored, in which case of course the transmitting station would always transmit according to the received return signal.

In the case of systematic repetitions, the bit trains could be identified by the way the various bit trains follow one another as a function of time.

Of course, the invention is not limited to the embodiments described and shown which were given solely way of example.

What is claimed is:

1. A transmitting station for transmitting intelligence from a binary data source, said station comprising : coding means having an input, for coding in a systematic recurrent code of length L a sequence of bits applied to said input, said coding means comprising a shift register having L successive stages, the first of said stages having an input and an output, and the last of said stages having an output, said input of said first stage forming the input of said coding means, and $m$ modulo 2 adders, $m$ being a positive integer, having respective outputs, each of said adders having a plurality of inputs respectively coupled to different stages of said shift-register, and an output, for delivering at its output a parity bit associated with the bit appearing at said output of said first stage; a timing circuit; first further means coupled to said timing circuit for successively applying to said input of said coding means the bits of a group of L message bits from said data source; second further means, coupled to said timing circuit, for successively applying to said input of said coding means the bits of a group of L message bits previously stored in said shift-register; controlling means, coupled to said timing circuit, for selectively actuating either said first further means or said second further means; and means for transmitting bit trains, referred to as continuation bit trains, each of which includes the L bits appearing at said first output of said first stage of said shift register upon said further means being actuated by said controlling means and the parity bits associated therewith, and further bit trains, referred to as repetition bit trains, each of which includes the L bits appearing at said output of said first stage of said shift-register, upon said second further means being actuated by said controlling means, and the parity bits associated therewith.

2. A transmitting station as claimed in claim 1, further comprising a receiver for receiving return signals, each of which is either a request for a continuation bit train signal, referred to as a "continuation request", or a request for a repetition bit train, referred to as a "repetition request", said receiver having an output coupled to said controlling means.

3. A transmitting station as claimed in claim 2, further comprising an auxiliary shift-register having $N_1$ stages, $N_1$ being an integer greater than 1, coupled for receiving the same clock pulses as said shift-register, hereinafter referred to as the main shift-register, and forming therewith a shift-register having $(L+N_1)$ stages, said first further means being connected between said data source and said auxiliary shift-register for applying through said auxiliary shift-register the message bits applied from said data source to said input of said coding means, and said second further means being connected between said output of said last stage of said main shift-register and said auxiliary shift-register for applying through said auxiliary shift-register the message bits applied from said main shift-register to said input of said coding means; write-in means for writing in said auxiliary shift-register, previous to an actuation of said first further means by said controlling means, a fixed continuation prefix of $N_1$ bits, and previous to an actuation of said second further means by said controlling means a fixed repetition prefix of $N_1$ bits; a continuation bit train comprising $(L+N_1)$ information bits including L message bits and the $N_1$ bits of the continuation prefix, and the parity bits formed by said modulo 2 adders for said $(L+N_1)$ information bits, and a repetition bit train comprising $(L+N_1)$ information bits including L message bits and the $N_1$ bits of the repetition prefix, and the parity bits formed by said modulo 2 adders for said last mentioned $(L+N_1)$ information bits.

4. A transmitting station as claimed in claim 3, wherein said controlling means include: a counter for counting the number of repetition requests received starting from the reception of the last received continuation request: means for blocking said counter upon its count reaching a predetermined number greater than one; means for, after receiving a return signal at a time where the count of said counter differs from said predetermined count, actuating said first further means or said second further means according to whether this return signal is a continuation request or a repetition request and means for, after reception of a return signal at a time when the count of said counter is equal to said predetermined count actuating said first further means and returning said count to zero if this return signal is the second of two successive return signals each of which is a continuation request, and actuating said second further means if the contrary is the case.

5. A receiving station comprising a receiver adapted for receiving a sequence of bit trains comprising identifiable continuation bit trains and repetition bit trains, the corresponding transmitted sequence resulting from the coding in a systematic recurrent code of information bits including at least message bits, and the formation of continuation and repetition bit trains, each including a predetermined number of information bits and the parity bits associated therewith, the message bits of a transmitted repetition bit train being identical to the message bits of the previously transmitted bit train; said station further comprising: a decoding arrangement for decoding the message bits included in the received bit trains, said decoding arrangement having a signal input coupled to said receiver, a control input, a first output for delivering the decoded bits, and a second output for delivering auxiliary signals, each of which is representative of the probability of accurateness of the decoded bit simultaneously appearing at its first output; signal generating means for identifying the nature, continuation or repetition, of the received bit trains and applying to said control input of said decoding arrangement, during the decoding of the message bits from a bit train, a control signal which is a first or a second decoding control signal according to whether the message bits being decoded belong to a continuation or a repetition bit train; a shift-register having an input coupled to said first output of said decoding arrangement and an output coupled to said decoding arrangement, for supplying thereto, when a message bit is being decoded, the decoded message bit corresponding to the message bit occupying in the bit train previously applied to said signal input of said decoding means the same position number as the message bit being decoded occupies in the bit train to which it belongs; storing means having an input coupled to said second output of said decoding arrangement and an output coupled to said decoding arrangement for supplying thereto the auxiliary signal associated with the bit simultaneously delivered by said output of said shift-register; said decoding arrangement comprising a decoder adapted to said code, whose input is said input of said decoding arrangement, and computing means coupled to said decoder, for, when a continuation bit train is applied to said input of said decoding arrangement, delivering for each message bit, at its first and second outputs respectively, a decoded bit and an associated auxiliary signal which are wholly determined by this continuation bit train and, when a repetition bit train is applied to said input of said decoding arrangement, delivering, for each message bit, at its first and second outputs respectively, a decoded bit and an associated auxiliary signal which are predetermined functions of the decoded bit and of the auxiliary signal which would be supplied if the message bit belonged to a continuation bit train, of the bit supplied by said output of said shift-register while this message bit is being decoded, and of the auxiliary signal simultaneously supplied by said output of said storing means, the operations performed by the decoding arrangement being respectively referred to as continuation decoding in the first case, and repetition decoding in the second case, and the nature of the decoding performed being determined by that one of said first and second decoding control signals which is applied to said control input.

6. A receiving station as claimed in claim 5, wherein, the first $N_1$, $N_1$ being a positive integer greater than 1, information bits of each transmitted continuation bit train are $N_1$ prefix bits forming a predetermined continuation prefix, and the first $N_1$ information bits of each transmitted repetition bit train are $N_1$ prefix bits forming a predetermined repetition prefix, each received bit train thus comprising $(N_1 + L)$ information bits, including $N_1$ prefix bits, said receiving station further comprises: a transmitter for transmitting a return signal which is either a request for a continuation bit train, referred to as a continuation request, or a request for a repetition bit train, referred to as a repetition request; wherein said decoding arrangement is further for decoding the $N_1$ prefix bits of each received bit train according to a continuation decoding; wherein said signal generating means is also for applying said first decoding control signal to said control input during the decoding of the bits of a prefix; wherein said signal generating means are coupled to said shift-register for receiving the decoded prefix bits of each bit train applied to said decoding arrangement and to said storing means for receiving the auxiliary signals associated with these prefix bits; wherein said generating means are for identifying the nature of a bit train through identifying the nature of its prefix and are also for delivering, for each bit train applied to said decoding means, a two-value channel quality signal which is a predetermined function of the last mentioned auxiliary signals if the identified prefix is the continuation prefix and a function of these last mentioned auxiliary signals and of the auxiliary signals having determined the previously delivered channel quality signal if the identified prefix is a repetition prefix, the first value of said channel quality signal meaning good quality and the second value poor quality; said receiving station further comprising: a data output for being coupled to a data receiver, switching means for selectively coupling said data output to, or decoupling it from, said first output of said decoding arrangement in the course of the decoding of the message bits; and a logical circuit, coupled to said signal generating means, for controlling said switching means to prevent said data output from receiving from said decoding arrangement decoded message bits derived from a bit train whose prefix was associated with a channel quality signal having said second value and for, in the same case, causing the transmission by said transmitter of a repetition request.

7. A receiving station as claimed in claim 6, adapted for supplying a data receiver which is per se always available for receiving data, wherein said logical circuit further comprises: a memory for storing the return signal transmitted after reception of each bit train; comparing means for delivering an "erroneous continuation" signal upon a continuation bit train being received in answer to a repetition request and a "correct continuation" signal upon a continuation bit train being receiving in answer to a continuation request; a second memory for storing the "correct continuation" signals and delivering for each of them a "message waiting" signal and means for causing the transmission of a request for continuation and the suppression of the "waiting message signal" after reception of a bit train only if the two following conditions are fulfilled: the channel quality signal supplied by said signal generating means for this bit train had the first value and this bit train was not a continuation bit train having given rise to an "erronenous continuation" signals and for causing the transmission of a repetition request in all the other cases; first additional means for controlling said switching means so that said data output is coupled to said output of said decoding arrangement in the course of the decoding of the message bits of a bit train only if the two following conditions are fulfilled: the "message waiting" signal was present upon the identification of the prefix of this bit train, and this identification was followed by a continuation request; said logical circuit further comprising second additional means for causing a subsidiary coupling from said shift-register to said data output during the decoding of the message bits of a bit train for the prefix of which said comparing means have delivered said "erroneous continuation" signal.

8. A receiving station as claimed in claim 7, further adapted for supplying a data receiver which may not always be available for receiving the L message bits of a bit train, said logical circuit further comprising an input for receiving from said receiver a data receiver signal having a first value indicating that it is available or a second value indicating that it is not available, and wherein said logical circuit further comprises means controlled by said second value of said data receiver signal for inhibiting the coupling of said output of said decoding means to said data output and for inhibiting said subsidiary coupling; and further means for blocking the feeding of said decoding arrangement and of said shift-register after the decoding of the messages of a bit train for whose prefix said comparing means have delivered an "erroneous continuation signal" while said data receiver had said second value, and for unblocking said feeding after said data receiver signal has resumed its first value.

9. A transmitting station as claimed in claim 1, wherein said controlling means comprise a modulo N counter, N>1 means, for applying to said counter pulses from said timing circuit at a fixed frequency, and means for actuating once said first further means each time said counter reaches a predetermined count and said second further means each time said counter reaches any other of its N possible counts.

10. A receiving station as claimed in claim 5, wherein, the first $N_1$, $N_1$ being a positive integer greater than 1, information bits of each transmitted continuation bit train are $N_1$ prefix bits forming a predetermined continuation prefix, and the first $N_1$ information bits of each transmitted repetition bit train are $N_1$ prefix bits forming a predetermined repetition prefix, each received bit train thus comprising ($N_1 + L$) information bits, including $N_1$ prefix bits, two successive continuation bit trains being separated by (N−1) repetition bit trains, N being an integer greater than 1, said decoding arrangement is further for decoding the $N_1$ prefix bits of each received bit train according to a continuation decoding; wherein said signal generating means is also for applying said first decoding control signal to said control input during the decoding of the bits of a prefix; wherein said signal generating means are coupled to said shift-register for receiving the decoded prefix bits of each bit train applied to said decoding arrangement and to said storing means for receiving the auxiliary signals associated with these prefix bits; wherein said generating means are for identifying the nature of a bit train through identifying the nature of its prefix; said receiving station further comprising: a data output for being coupled to a data receiver; switching means connected between said output of said shift-register and said data output; and a logical circuit coupled to said signal generating means for controlling said switching means so that said data output only receives from said output of said shift-register those decoded bits resulting from the decoding of the message bits of those repetition bit trains which have been followed by a continuation bit train.

* * * * *